US 8,469,817 B2
Jun. 25, 2013

(12) United States Patent
Eck et al.

(10) Patent No.: US 8,469,817 B2
(45) Date of Patent: Jun. 25, 2013

(54) GAME MACHINE HAVING WIRELESS COMMUNICATION CAPABILITY

(75) Inventors: Charles P. Eck, Sammamish, WA (US); Hiroshi Kamada, Kyoto (JP); Claude Comair, Bellevue, WA (US)

(73) Assignee: Nintendo Co., Ltd., Kyoto (JP)

( * ) Notice: Subject to any disclaimer, the term of this patent is extended or adjusted under 35 U.S.C. 154(b) by 1557 days.

(21) Appl. No.: 11/896,543

(22) Filed: Sep. 4, 2007

(65) Prior Publication Data

US 2008/0119274 A1 May 22, 2008

Related U.S. Application Data

(62) Division of application No. 10/805,243, filed on Mar. 22, 2004, now Pat. No. 7,275,994, which is a division of application No. 09/659,738, filed on Sep. 11, 2000, now Pat. No. 6,716,103.

(60) Provisional application No. 60/158,045, filed on Oct. 7, 1999.

(51) Int. Cl.
*G06F 17/00* (2006.01)
(52) U.S. Cl.
USPC ........ 463/42; 463/9; 463/16; 463/36; 463/37; 463/39; 463/40; 463/41; 709/204; 709/205; 709/206

(58) Field of Classification Search
USPC ................... 463/16–20, 9, 31, 36, 37, 39–43; 709/204–206
See application file for complete search history.

(56) References Cited

U.S. PATENT DOCUMENTS

| | | | |
|---|---|---|---|
| 5,324,035 A | 6/1994 | Morris et al. | 273/138 A |
| 5,347,306 A | 9/1994 | Nitta | 348/15 |
| 5,371,493 A | 12/1994 | Sharpe et al. | 340/5.42 |
| 5,376,931 A | 12/1994 | Marrs | 340/7.55 |
| 5,387,904 A | 2/1995 | Takada | 340/825.44 |
| 5,393,073 A | 2/1995 | Best | 463/1 |
| 5,429,363 A | 7/1995 | Hayashi | 273/148 B |
| 5,510,778 A | 4/1996 | Krieter et al. | 340/825.44 |
| 5,528,248 A * | 6/1996 | Steiner et al. | 342/357.06 |

(Continued)

FOREIGN PATENT DOCUMENTS

| | | |
|---|---|---|
| EP | 0 821 536 | 1/1998 |
| EP | 0868 032 A2 | 9/1998 |

(Continued)

OTHER PUBLICATIONS

Network Queuing Theory and its Application to Computer System Models, submitted by Milwaukee School of Engineering [retrieved from http://people.msoe.edu/~barnicks/courses/cs384/papers9899/torres.pdf], Jan. 28, 1999.

(Continued)

*Primary Examiner* — Sunit Pandya
(74) *Attorney, Agent, or Firm* — Nixon & Vanderhye, P.C.

(57) ABSTRACT

A video game machine is provided with wireless functionality. The wireless functionality may be built-into the video game machine or may be provided by a device that is removably attachable to the video game machine. The wireless functionality enables, among other things, enhanced multi-player capabilities, the ability to receive video game updates, new game levels and new games.

20 Claims, 38 Drawing Sheets

U.S. PATENT DOCUMENTS

| | | | | |
|---|---|---|---|---|
| 5,538,255 | A | 7/1996 | Barker | 463/41 |
| 5,558,339 | A | 9/1996 | Perlman | 463/42 |
| 5,618,045 | A | 4/1997 | Kagan et al. | 463/40 |
| 5,624,316 | A | 4/1997 | Roskowski et al. | 463/45 |
| 5,646,629 | A | 7/1997 | Loomis et al. | |
| 5,651,060 | A | 7/1997 | Cohn et al. | |
| 5,663,717 | A | 9/1997 | DeLuca | 340/825.36 |
| 5,733,131 | A | 3/1998 | Park | 434/307 R |
| 5,738,583 | A | 4/1998 | Comas et al. | 463/40 |
| 5,761,485 | A | 6/1998 | Munyan | 395/500 |
| 5,768,382 | A | 6/1998 | Schneier et al. | 380/23 |
| 5,795,228 | A | 8/1998 | Trumbull et al. | 463/42 |
| 5,809,415 | A | 9/1998 | Rossmann | 340/7.21 |
| 5,812,930 | A | 9/1998 | Zavrel | 455/5.1 |
| 5,879,236 | A | 3/1999 | Lambright | 463/42 |
| 5,880,731 | A | 3/1999 | Liles et al. | 345/758 |
| 5,889,473 | A | 3/1999 | Wicks | 340/825.44 |
| 5,941,775 | A | 8/1999 | Naka et al. | 463/44 |
| 5,942,969 | A | 8/1999 | Wicks | 340/286.02 |
| 5,956,485 | A | 9/1999 | Perlman | 395/200.34 |
| 5,960,173 | A | 9/1999 | Tang et al. | 709/201 |
| 5,964,660 | A | 10/1999 | James et al. | 463/1 |
| 5,971,397 | A | 10/1999 | Miguel et al. | 273/371 |
| 5,971,849 | A | 10/1999 | Falciglia | 463/16 |
| 5,984,786 | A | 11/1999 | Ehrman | 463/42 |
| 5,987,376 | A | 11/1999 | Olson et al. | 701/201 |
| 5,999,808 | A * | 12/1999 | LaDue | 455/412.2 |
| 5,999,932 | A | 12/1999 | Paul | 707/10 |
| 6,009,458 | A | 12/1999 | Hawkins et al. | 709/203 |
| 6,018,766 | A | 1/2000 | Samuel et al. | 709/218 |
| 6,023,729 | A | 2/2000 | Samuel et al. | 709/225 |
| 6,044,247 | A | 3/2000 | Taskett et al. | 340/7.28 |
| 6,052,372 | A | 4/2000 | Gittins et al. | 370/396 |
| 6,061,722 | A | 5/2000 | Lipa et al. | 709/224 |
| 6,062,991 | A | 5/2000 | Moriarty et al. | 473/407 |
| 6,078,948 | A | 6/2000 | Podgorny et al. | 709/204 |
| 6,120,379 | A | 9/2000 | Tanaka et al. | |
| 6,125,386 | A | 9/2000 | Cho | 709/205 |
| 6,134,590 | A | 10/2000 | Perlman | 709/228 |
| 6,199,012 | B1 * | 3/2001 | Hasegawa | 701/208 |
| 6,320,495 | B1 * | 11/2001 | Sporgis | 340/323 R |
| 6,352,479 | B1 | 3/2002 | Sparks, II | 463/29 |
| 6,449,344 | B1 | 9/2002 | Goldfinger et al. | 379/88.17 |
| 6,677,968 | B1 | 1/2004 | Appelman | 345/853 |
| 6,852,033 | B2 * | 2/2005 | Kinjo et al. | 463/30 |

FOREIGN PATENT DOCUMENTS

| | | |
|---|---|---|
| GB | 2287414 | 9/1995 |
| GB | 2331195 | 5/1999 |
| JP | 07 088523 | 4/1995 |
| JP | 07-274228 | 10/1995 |
| JP | 9 224271 | 8/1997 |
| JP | 10 076071 | 3/1998 |
| JP | 10 327439 | 12/1998 |
| JP | 11-088508 | 3/1999 |
| JP | 11-137851 | 5/1999 |
| JP | 11-271420 | 10/1999 |
| WO | WO 93/23125 | 11/1993 |
| WO | 9801836 | 1/1998 |

OTHER PUBLICATIONS

Why Newton? [http://users.primushost.com/-rik/newtontoday/why.htmll], Newton Today, Aug. 16, 1996, pp. 1-5.

AOL Instant Messenger (SM) Help, 1999, America Online, Inc., Version 3.0.1464, see entire document.

ICQ: A user's guide. Publication [online]. Rose Vines, 1999 [retrieved on May 8, 2003]. Retrieved from the Internet: URL:www.geekgirls.com/net_icq_guide.htm.

FIBS—Original announcement. Publication [online]. Backgammon Galore, Jul. 19, 1992 [retrieved on May 8, 2003]. Retrieved from the Internet: URL:www.bkgm.com/rgb/rgb.cgi?view+229>.

FIBS/W screenshots and help, 1995, Robin Davies, Version 1.35, see entire document.

First Internet Backgammon Server. Publication [online]. FIBS, 1994 [retrieved on Sep. 17, 2002]. Retrieved from the Internet: URL:www.fibs.com/guide.html.

Ad potential driving messaging war. Publication [online]. USA Today, 1999 [retrieved on Sep. 17, 2002], Rretrieved from the Internet: URL:www.usatoday.com/life/cyber/tech/ctf683.htm.

For Instant Success, Add Instant Messaging. Publication [online]. Byte.com, 1999 [retrieved on Sep. 17, 2002]. Retrieved from the Internet: URL:www.byte.com.documents/s=215/byt19991l1s0010/index.htm.

Instant Messaging Guide. Publication [online]. Views.com, 1996 [retrieved on Aug. 1, 2002]. Retrieved from the Internet:URL:www.viewz.com/features/imprint.htm.

AOL Instant Messenger, Quick Tips for Getting Started, Jan. 1998, retrieved from URL:http://web.archive.org/web/19980111061346/www.aol.com/aim/quicktips.html on Feb. 17, 2005, pp. 1-6.

Wagner et al., "Human Factors Design Guide: For Acquisition of Commercial-Off-The-Shelf Subsystems, Non-Developmental Items, and Developmental Systems", Jan. 1996, pp. 8-136 to 8-148.

* cited by examiner

Protictive Flap Open

Game Inserted

Pager Cartridge With Portable Game Machine

Fig. 11A

SAMPLE MESSAGES

| | COMMUNICATION | CHARACTERS | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|---|---|
| | | | | | | | | | | | | | | | | | $0.0625 | | | | | | | | $0.06 |
| (a) | 1) QUESTION | NORMAL | I | _ | L | O | V | E | _ | Y | O | U | | | | | | | | | | | | | |
| (b) | | CODED | I | ♥ | U | | | | | | | | | | | | | | | | | | | | | |
| (c) | RESPONSE | CODED | ☺ | | | | | | | | | | | | | | | | | | | | | | | |
| (d) | 2) QUESTION | NORMAL | C | A | L | L | _ | H | O | M | E | _ | N | O | W | | | | | | | | | | |
| (e) | | CODED | 9 | 1 | 1 | | | | | | | | | | | | | | | | | | | | | |
| (f) | RESPONSE | CODED | ✋ | | | | | | | | | | | | | | | | | | | | | | | |
| (g) | 3) QUESTION | NORMAL | M | E | E | T | _ | Y | O | U | _ | @ | M | A | L | L | _ | 3 | P | M | | | | | |
| (h) | | CODED | M | A | L | L | @ | 3 | ? | | | | | | | | | | | | | | | | | |
| (i) | RESPONSE | CODED | ☝ | ☺ | | | | | | | | | | | | | | | | | | | | | | |
| (j) | 4) QUESTION | NORMAL | W | H | A | T | _ | I | S | _ | A | N | S | W | E | R | _ | T | O | _ | # | 3 | ? | | |
| (k) | | CODED | ? | # | 3 | | | | | | | | | | | | | | | | | | | | | |
| (l) | RESPONSE | CODED | ☝ | | | | | | | | | | | | | | | | | | | | | | | |
| (m) | 5) QUESTION | NORMAL | D | E | F | E | A | T | E | D | _ | B | O | W | S | E | R | ! | | | | | | | |
| (n) | | CODED | ✂ | B | O | W | S | E | R | | | | | | | | | | | | | | | | | |
| (o) | RESPONSE | CODED | K | E | W | L | ! | U | R | G | R | B | | | | | | | | | | | | | |
| (p) | 6) QUESTION | NORMAL | C | H | E | C | K | _ | Y | O | U | R | _ | E | M | A | I | L | | | | | | | |
| (q) | | CODED | ✓ | ✉ | ! | | | | | | | | | | | | | | | | | | | | | |
| (r) | RESPONSE | CODED | K | _ | L | B | R | | | | | | | | | | | | | | | | | | | |
| (s) | 7) QUESTION | NORMAL | H | O | W | _ | M | A | N | Y | _ | P | O | K | E | M | O | N | _ | I | N | _ | S | N | A | P |
| (t) | | CODED | # | _ | O | F | _ | P | M | _ | I | N | _ | S | N | A | P | ? | | | | | | | |
| (u) | RESPONSE | CODED | 6 | 3 | ! | | | | | | | | | | | | | | | | | | | | | |
| (v) | 7) QUESTION | NORMAL | I | S | _ | Y | O | U | R | _ | D | A | D | _ | H | O | M | E | ? | | | | | | |
| (w) | | CODED | ✋ | D | A | D | H | O | M | E | | | | | | | | | | | | | | | |
| (x) | RESPONSE | CODED | U | R | M | Y | ☀ | ! | ☺ | | | | | | | | | | | | | | | | | |

CHAT CODES

| CODE | TRANSLATION |
|---|---|
| NE1 | ANYONE |
| P2P | PERSON TO PERSON |
| ANY1 | ANYONE |
| IM | INSTANT MESSAGE |
| | |
| OH LOL | O LAUGH OUT LOUD |
| 4EVER | FOREVER |
| CME | SEE ME |
| WANT 2 CHAT | WANT TO CHAT |
| GTG | GOOD TO GO |
| BYEEEEEE | BYE |
| ;) or >;) | WINK |
| RROOOORAAARRR | RCAR |
| hehe | HA HA |
| LUV | LOVE |
| ROTFLOL | ROLL ON THE FLOOR LAUGHING OUT LOUD |
| | |
| BRB | BE RIGHT BACK |

Fig.11B

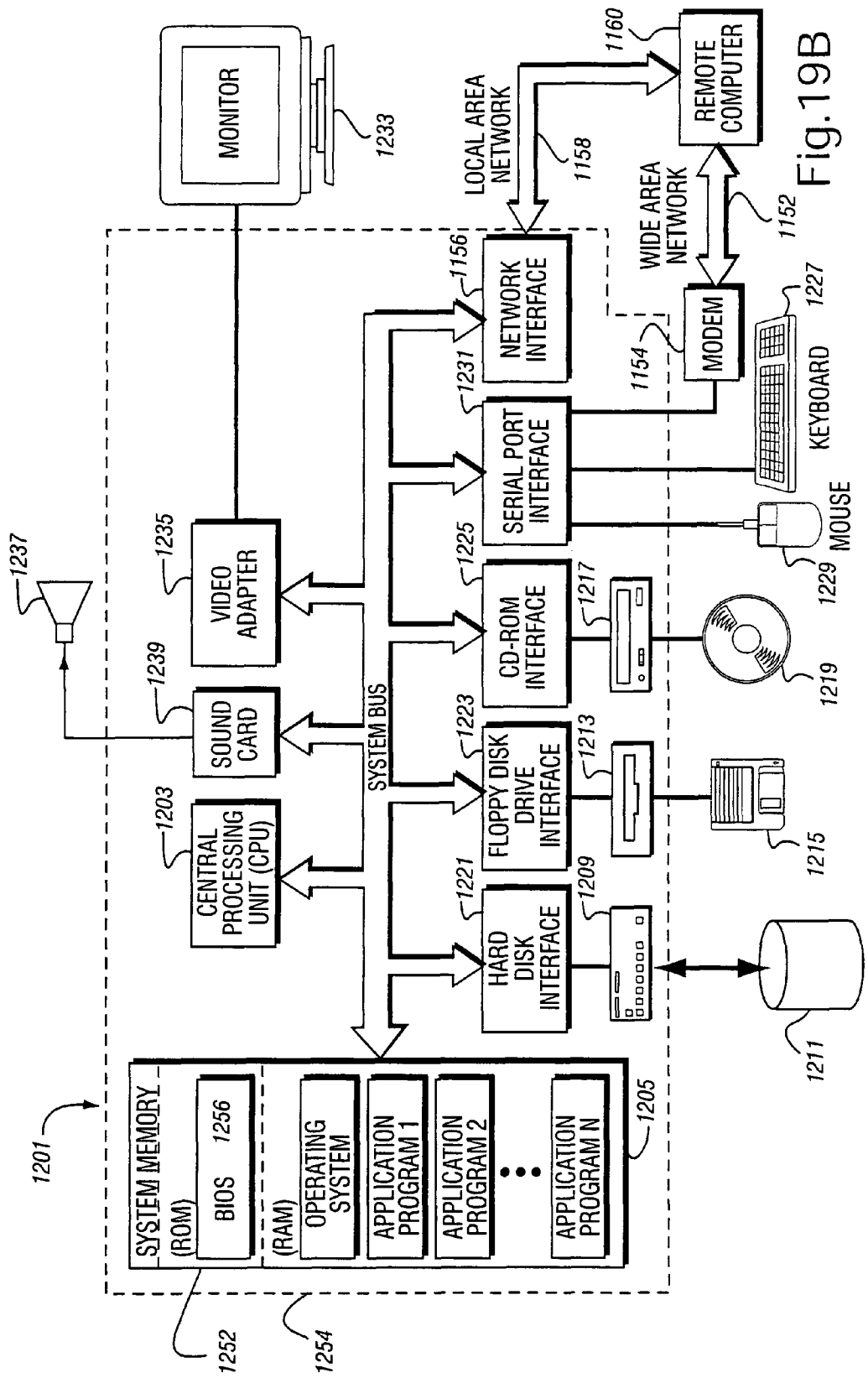

GAME MACHINE HAVING WIRELESS COMMUNICATION CAPABILITY

CROSS-REFERENCE TO RELATED APPLICATIONS

This application is a divisional of application Ser. No. 10/805,243, filed Mar. 22, 2004, now U.S. Pat. No. 7,275,994 which is a divisional of application Ser. No. 09/659,738, filed Sep. 11, 2000, now U.S. Pat. No. 6,716,103 which claims domestic priority in accordance with the provisions of 35 U.S.C. Section 119(e) from provisional Application No. 60/158,045, filed on Oct. 7, 1999. The contents of provisional Application No. 60/158,045 are incorporated herein in their entirety.

COPYRIGHTS PRESERVED

A portion of the disclosure of this patent document contains material which is subject to copyright protection. The copyright owner has no objection to the facsimile reproduction by anyone of the patent document or patent disclosure as it appears in the Patent and Trademark Office patent files or records, but otherwise reserves all copyright rights whatsoever.

BACKGROUND AND SUMMARY

This invention generally relates to a portable game machine and, more particularly, to a portable game machine that is selectively configurable for one or more different operations such as wireless communications, global positioning, image capturing and combinations thereof.

Over the years, portable (or hand-held) game machines have been (and continue to be) very popular. Typically, these portable game machines include a hand-held game machine housing a processing unit and associated hardware for running a game program, and include a display for displaying images of the game. The game program itself is typically contained in a game program memory such as, for example, a semiconductor memory (e.g., ROM, EPROM, etc.) that is part of a removable cartridge. By storing the game program in a removable cartridge, the user can conveniently and easily change the game being played by simply exchanging one cartridge with another, different cartridge containing a different game. Examples of portable game machines are the "Game Boy®" and "Game Boy® Color" products manufactured and sold by Nintendo of America Inc.

Generally, the functionality of conventional portable game machines of the type described above is directed to executing the game that is contained in the game program memory of a particular removable cartridge. In addition, these game machines are sometimes configured to permit games having a two-player mode to be played. In one such implementation, two portable game machines are connected together by a cable. In another implementation, infrared communications between two portable game machines are used. However, both of these implementations require that the portable game machines be in physical proximity to each other.

Thus, it would be desirable to provide a portable game machine that provides enhanced multi-player capabilities through communications with other game machines, portable or otherwise. It would also be desirable to provide a portable game machine to which game updates, new game levels and new games can be easily communicated and to take advantage of the existing portable game machine hardware and user interface as a basis for additional communications capabilities. It would further be desirable to provide these enhanced capabilities to other gaming systems such as console game machines that are connected to a user's television set.

In accordance with one aspect of the present invention, a global positioning system (GPS) cartridge is provided for use with a game machine having a game program executing processing system including a microprocessor to execute a video game program and player controls operable by a player to generate video game control signals. The GPS cartridge includes GPS circuitry configured to determine position based on signals received from GPS satellites and a connector that, in use, electrically connects the GPS cartridge to the game machine so that the position determined by the GPS circuitry is usable during execution of the video game program.

In accordance with another aspect of the present invention, a game machine is provided with radio circuitry configured to transmit and receive messages via a paging system, a user interface enabling a user to provide inputs to the game machine, and a memory for storing message credits. A processing system is operable in response to user inputs to transmit messages via the paging system if sufficient message credits are stored in the memory.

Still other features and advantages of the present invention will become more apparent from the following detailed description when read in conjunction with the accompanying drawings.

BRIEF DESCRIPTION OF THE DRAWINGS

FIG. 11A illustrates sample conversations and FIG. 11B illustrates sample chat codes.

FIGS. 19A-19C show example alternative compatible implementations.

DETAILED DESCRIPTION OF EXAMPLE EMBODIMENTS

The present invention is described in the context of example embodiments. However, the scope of the invention is not limited to these particular example embodiments. Rather, the example embodiments merely serve to illustrate various principles and characteristics of the present invention.

Figure 1A:
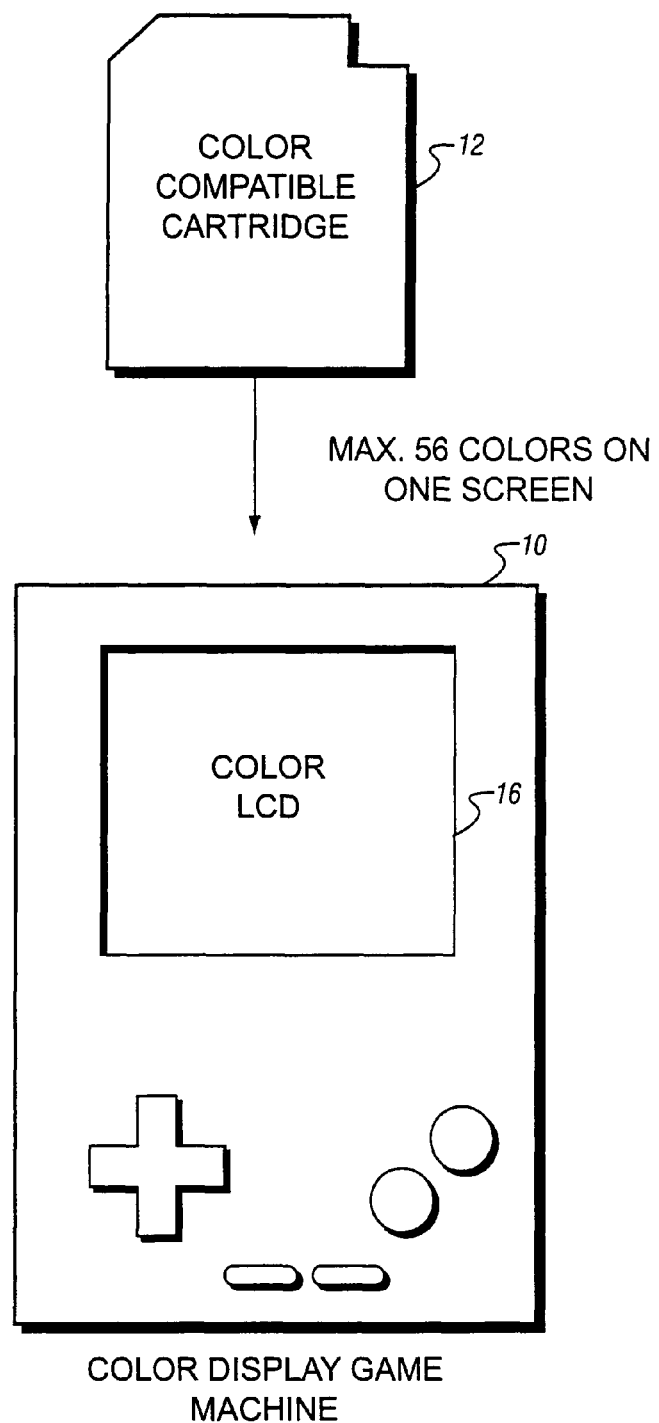
FIGS. 1A-1C show an example portable (handheld) game machine.
Figure 1B:
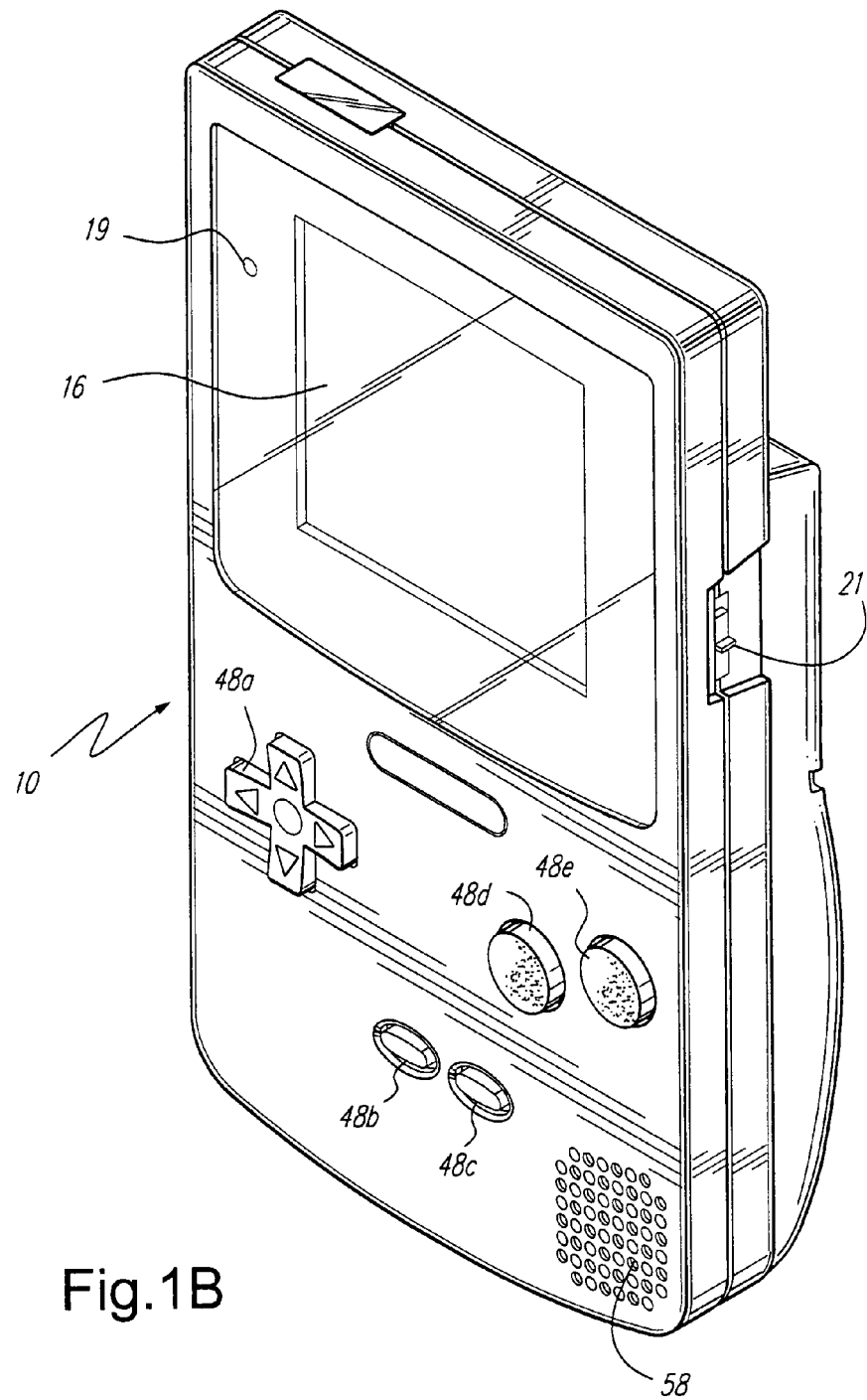
Figure 1C:
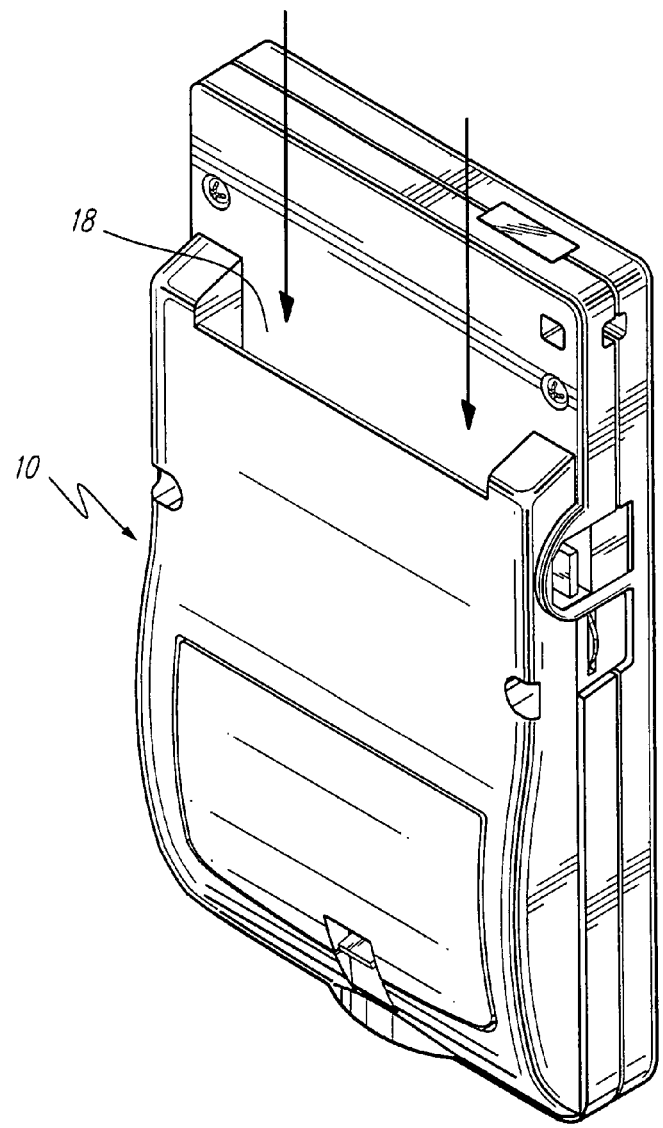

FIGS. 1A, 1B and 1C show an example portable (hand-held) color display game machine (hereinafter, referred to simply as "game machine") 10 that displays game characters in color on a color liquid crystal display (LCD) 16 when a color-ready game cartridge 12 is selectively inserted into a slot 18 (see FIG. 1C). The color LCD 16 displays characters using, for example, up to a maximum of 56 colors if the color-ready game cartridge 12 is inserted into the game machine 10. Game machine 10 may also be configured to receive monochrome game cartridges (not shown) and to display monochrome characters on LCD 16. Example game machine 10 may, for example, be a GameBoy® Color game machine, although it will be readily recognized that the features described below are readily applicable to other portable game machines.

Figure 2:
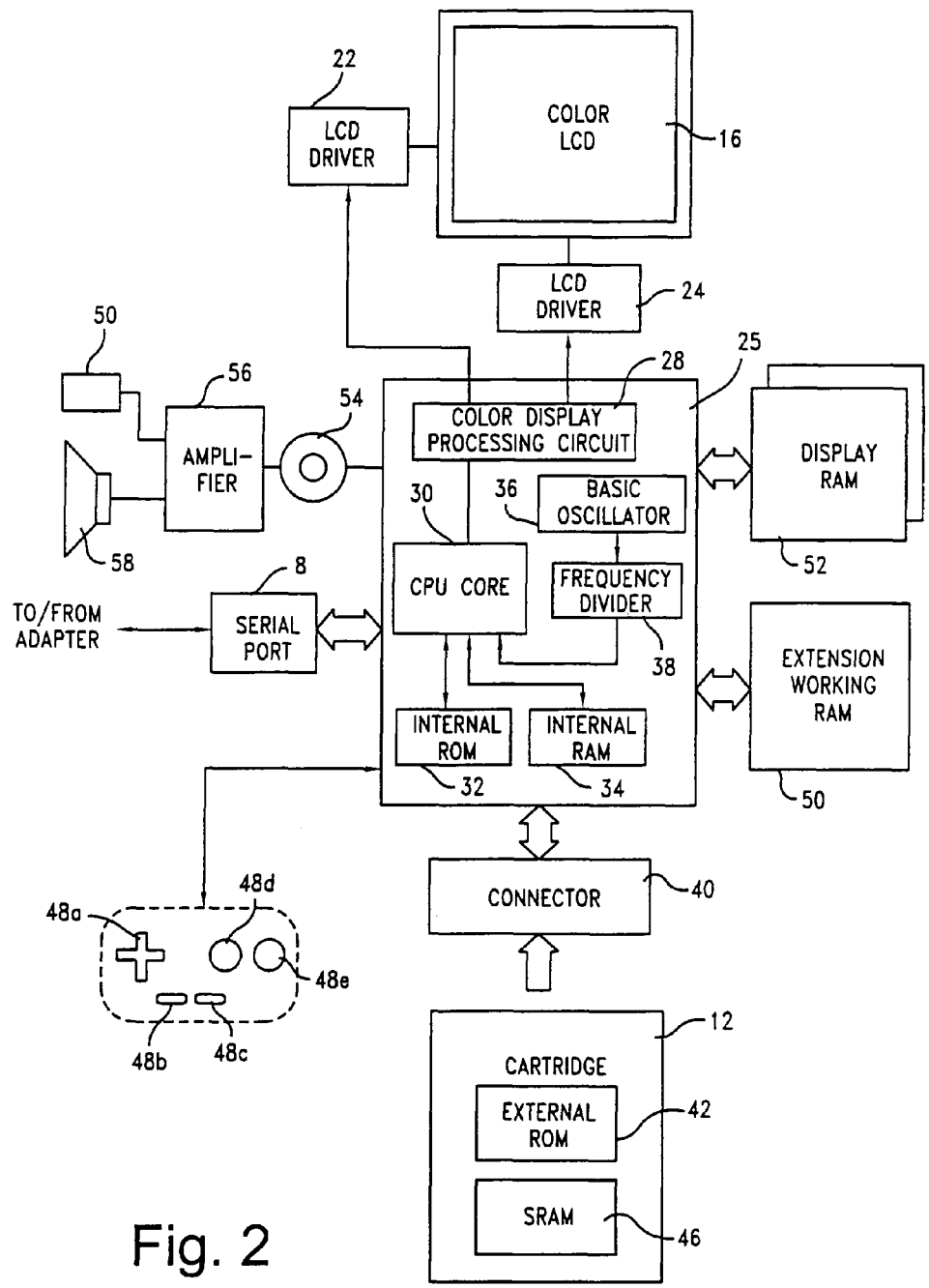
FIG. 2 is an overall block diagram of the game cartridge and the game machine shown in FIG. 1.

With reference to FIG. 2, game machine 10 includes color LCD 16 as described above. Color LCD 16 is formed as a dot matrix display and is driven by LCD drivers 22 and 24 to display color images on its screen. LCD driver 22 selectively drives, for example, the rows of the dot matrix display and LCD driver 24 selectively drives, for example, the columns of the dot matrix display. LCD drivers 22, 24 are supplied with color image signals from a color display processing circuit 28 included in a central processing unit (CPU) 26.

CPU 26 further includes a CPU core 30 that is connected to an internal read only memory (ROM) 32 and an internal random access memory (RAM) 34. Internal RAM 34 is used as a work memory of CPU core 30. CPU 26 further includes a basic oscillator 36. Basic oscillator 36 is formed of, for example, a quartz oscillator, and supplies an oscillating signal to a programmable frequency divider 38. Programmable frequency divider 38 divides the oscillating signal from basic oscillator 36 in accordance with frequency division data from CPU core 30, and supplies a divided signal as a clock of CPU core 30.

A connector 40 is connected to CPU 26 by an appropriate bus. Game cartridge 12 shown in FIG. 1 is selectively attachable to connector 40. Game cartridge 12 is preferably in the form of a replaceable memory cartridge insertable into slot 18 of game machine 10. Game cartridge 12 may be in the form of a plastic housing that encases a printed circuit board. The printed circuit board has a connector defining a number of electrical contacts. When game cartridge 12 is inserted into slot 18 of game machine 10, the cartridge electrical contacts mate with corresponding "edge connector" electrical contacts within game machine 10. This action electrically connects the printed circuit board contained within the plastic housing to the electronics within game machine 10. In this example, the printed circuit board of game cartridge 12 at least includes a read-only memory (ROM) 42 and a read/write memory (e.g., SRAM) 46. ROM 42 stores instructions and other information pertaining to a particular video game. ROM 42 for one game cartridge 12 may, for example, contain instructions and other information for an adventure game while the ROM of another game cartridge 12 may contain instructions and other information for a car race game, an educational game, etc. To play a game, a user of game machine 10 need only plug the appropriate game cartridge into slot 18 of game machine 10—thereby connecting the cartridge's ROM 42 (and other any circuitry it may contain) to game machine 10. This enables the game machine circuitry to access information contained with ROM 42 (and read/write memory 46), which information controls the game machine to play the appropriate video game by displaying images and reproducing sound as specified under control of the ROM game program information. Read/write memory 46 is used to store data such as game backup data.

CPU 26 is supplied with operation signals from operating keys 48a-48e. Operating key 48a is used, among other things, to move a game character displayed on color LCD 16 in four directions, that is, upward, downward, right and left. Operating key 48b is a select key that is used for, for example, game mode selection and the like. Operating key 48c is a start key that is used to start playing the game or to temporarily stop the progress of the game. Operating keys 48d, 48e are pushbutton switches. By pushing operating keys 48d, 48e, it is possible to cause various motions of the game characters displayed on color LCD 16, for example, a weapon use, a jump and the like. Operating keys 48a-48e are disposed in a forward surface of game machine 10 as shown in FIG. 1 B. Operating keys 48a-48e are also usable in connection with various features described below. A key matrix (not shown) is provided for sending CPU 26 the operation signals from operating keys 48a-48e as controller data.

Batteries (not shown) (e.g., 2 AA batteries) provide power for game machine 10. A power indicator LED 19 (see FIG. 1B) may dim as the batteries lose their charge, thereby providing a visual indication to the user that new batteries are needed. Game machine 10 may also be configured for connection to an AC adapter to permit extended use without batteries.

In accordance with the game program, character data supplied from game cartridge 12 and the controller data from operating keys 48a-48e, CPU 26 executes data processing and writes display data into a display RAM 52, using an extended RAM 50 when necessary. The display RAM 52 has two banks, that is, a first bank and a second bank, and has, as a whole, a storage area that is greater than the display area of color LCD 16, thereby enabling a scrolling display upward and downward and/or rightward and leftward on the screen of color LCD 16. As a result of the data processing by CPU 26, sound signals to be output are adjusted in level by volume controls 54 and 56, and then outputted to a speaker 58 and/or an earphone jack 60. Sound signals output from speaker 58 and/or earphone jack 60 include game sound effects, voices and music.

Generally speaking, to use game machine 10 to play a game, a user selects a game cartridge 12 containing a desired video game, and inserts that game cartridge into slot 18 of game machine 10, thereby electrically connecting ROM 42 and other cartridge electronics to game machine 10. The user then operates a power switch 21 (see FIG. 1B) to turn on game machine 10 and operates operating keys 48a-48e to control video game play. For example, depressing operating key 48c may cause the video game to start playing. Actuating operating key 48a may cause animated characters to move on color LCD 16 in controllably different directions.

Additional features of game machine 10 may be found in application Ser. No. 09/321,201, filed May 27, 1999, now U.S. Pat. No. 6,315,669, the contents of which are incorporated herein in their entirety.

As will be explained in greater detail, cartridges other than game cartridges are insertable into slot 18 of game machine 10. One illustrative example is a cartridge that houses the elements of a two-way pager. Like game cartridge 12, the pager cartridge includes a plastic housing that encases a printed circuit board on which is mounted the components of the pager. This printed circuit board of the pager cartridge has a connector defining a number of electrical contacts that mate with the corresponding edge connector electrical contacts within the game machine 10 when the pager cartridge is inserted into the slot of the game machine. This electrical connection between the pager cartridge and the game machine permits the implementation of many advantageous features that will be described in greater detail below.

In an example implementation, the pager cartridge is itself provided with a slot for receiving a cartridge such as a game cartridge. The slot of the pager cartridge is provided with "edge connector" electrical contacts that mate with the electrical contacts of the cartridge inserted therein. In this way, a game cartridge 12 may be "piggy-backed" onto the pager cartridge when the pager cartridge is inserted into slot 18 of game machine 10. The edge connector electrical contacts of the pager cartridge are connected via a bus to those electrical contacts of the pager cartridge that mate with the edge connector electrical contacts of game machine 10. In this way, ROM 42 of game cartridge 12 (and any other circuitry game cartridge 12 may contain) is electrically connected to game machine 10 and a user may play the game stored on game cartridge 12 even when the pager cartridge is attached to game machine 10.

As will be further described below, cartridges including the components of a global position system (GPS), or of a digital camera, or of a read/write memory may also be piggy-backed onto the pager cartridge when the pager cartridge is inserted into the slot of game machine 10.

Figure 3:
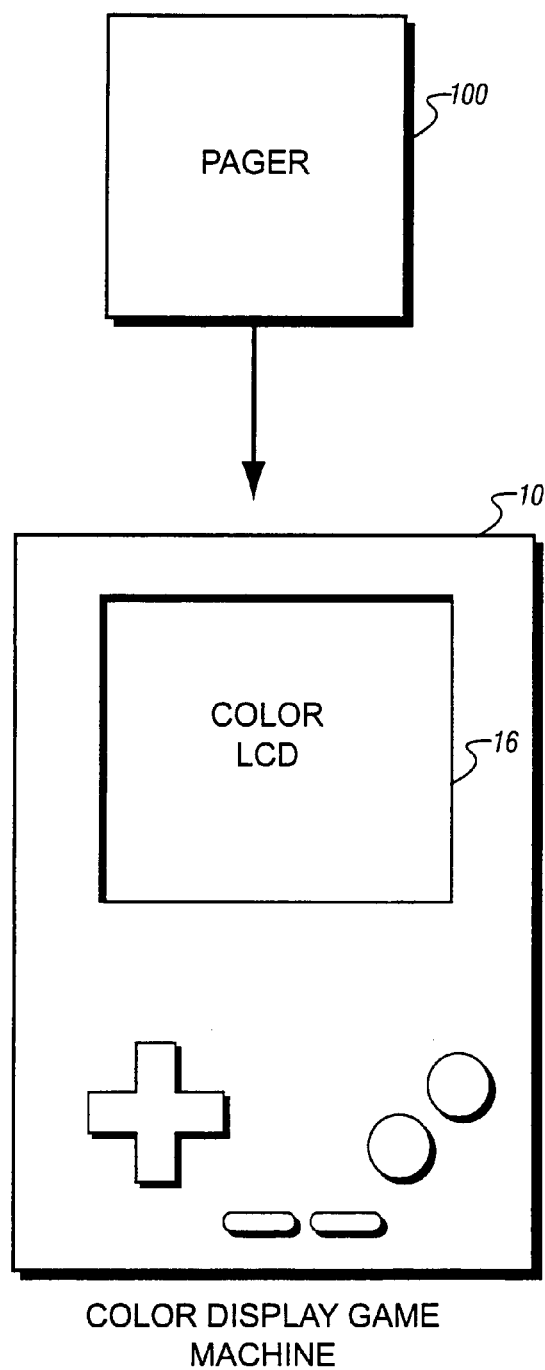
FIG. 3 illustrates a portable game machine and a pager selectively attachable to the portable game machine.

FIG. 3 illustrates a pager cartridge 100 that is selectively attachable to game machine 10 via connector 40. Generally speaking, paging systems are well-known in the art. For example, with reference to FIG. 4, U.S. Pat. No. 5,805,077 discloses a two-way paging system 101 that includes paging stations 103, paging terminals 105, public switched telephone network (PSTN) 107, paging receivers 109 and a pager 111. While only two paging terminals 105 are shown, a paging system may include many paging terminals. Likewise, the number of other components of paging system 101 is merely illustrative.

Paging stations 103 are also referred to as base stations or paging transmitters. In operation, callers who wish to page a system user use PSTN 107 to call the system user's pager telephone number. In a system including pager-equipped portable game machines, a computer of the game content provider may be connected to PSTN 107. Alternatively, pages can be originated through a computer network directly connected to a paging terminal. The call is routed, perhaps through a plurality of paging terminals, from PSTN 107 to paging terminal 105 that formulates a page. The page is distributed over a communications network to each of paging stations 103. Paging stations 103 in turn transmit the page throughout the geographic coverage area of paging system 101. For example, the page may be broadcast over radio waves on a dedicated frequency. The paging system may operate using any well-known protocol such as Flex, ReFlex (e.g., ReFlex 25) or POCSAG.

If pager cartridge 100 is within the geographic coverage area of paging system 101, pager cartridge 100 receives the page and processes the message embedded within the page. Generally, pager cartridge 100 also includes a vibrating or beeping mechanism to inform the person carrying the pager that he or she has received a message. Pager cartridge 100 may itself be configured to communicate messages (visually and/or aurally) to the user.

Figure 4:
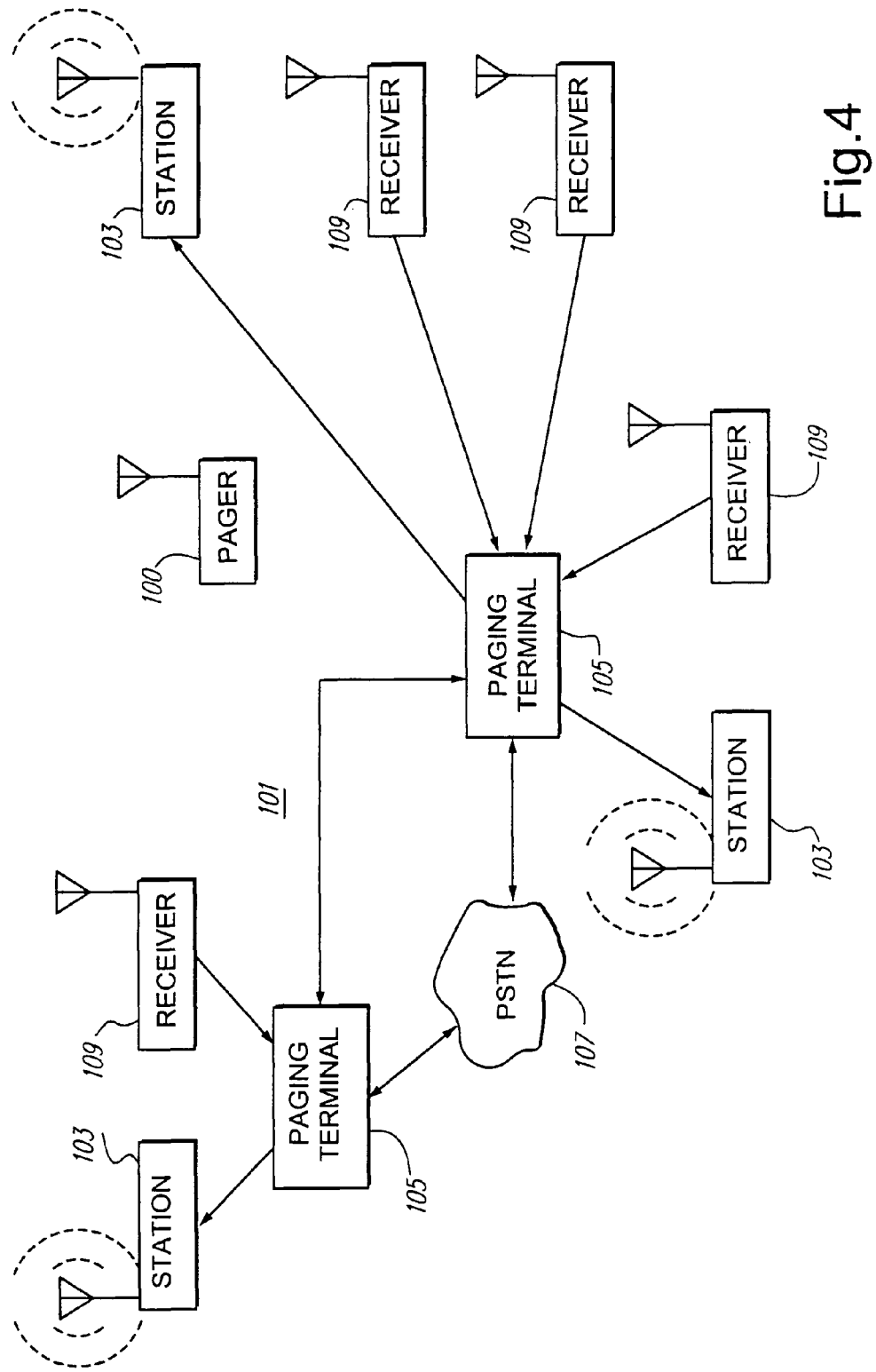
FIG. 4 illustrates a two-way paging system in which the present invention may be implemented.

In accordance with one aspect of the present invention, pager cartridge 100 shown in FIG. 4 is provided as a pager cartridge 100 that is insertable into slot 18 of game machine 10. Pager cartridge 100 is configured to transfer messages received over paging system 101 to game machine 10 when pager cartridge 100 is inserted into slot 18 of game machine 10. In this case, game machine 10 communicates (visually and/or aurally) the messages to the user. In some cases, the messages relate to game playing aspects of the game machine and such messages are used by game machine 10 to update or modify certain of these game playing aspects as will be described in greater detail below.

In the two-way paging system, pager cartridge 100 is configured to broadcast back to paging receivers 109 an acknowledgment signal that informs paging terminal 105 that the page has been successfully received. Pager cartridge 100 may also initiate other types of messages that are unsolicited and are not acknowledgments for received messages. Various examples of these messages will be described in greater detail below.

Figure 5A:
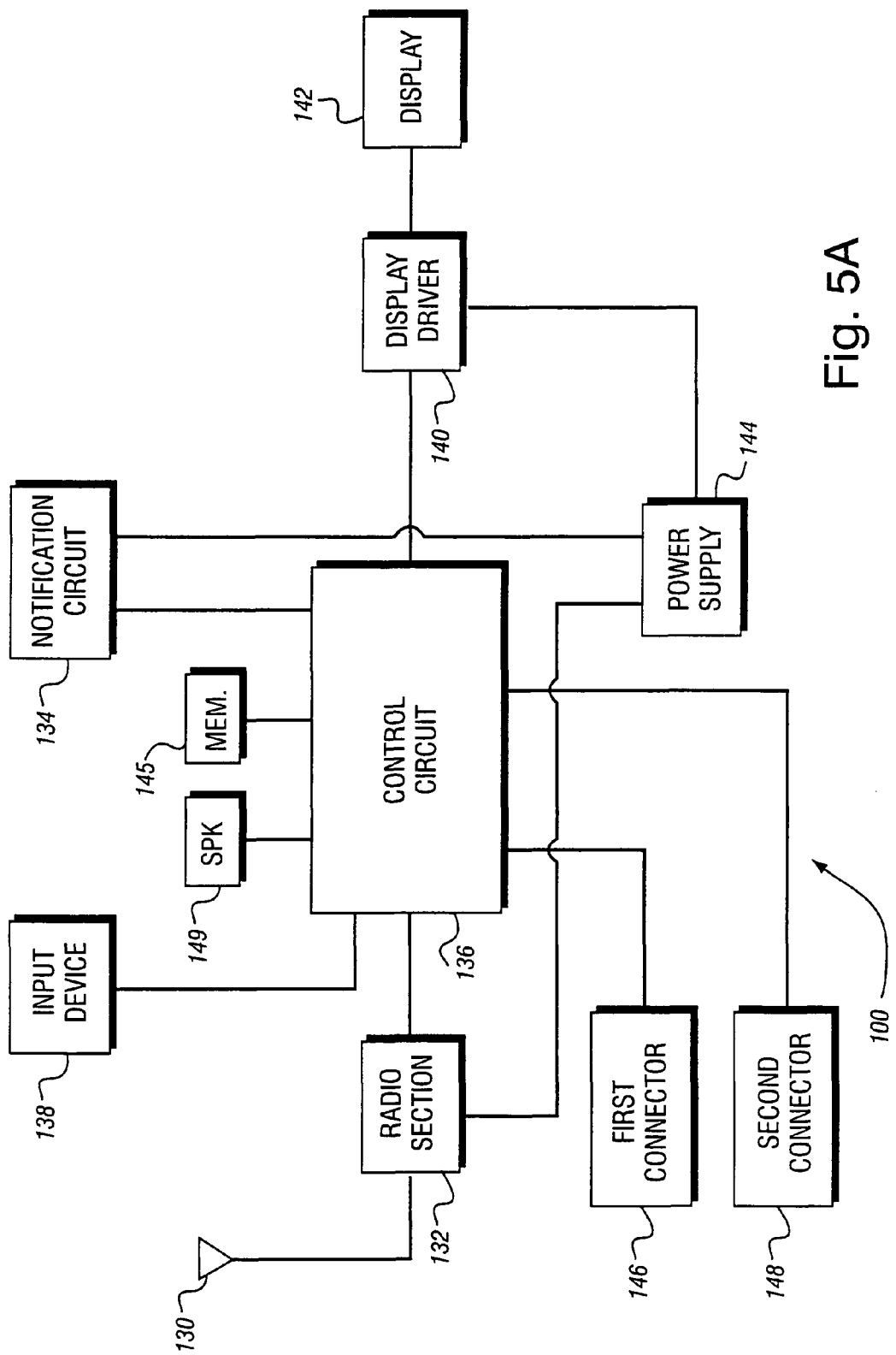
FIGS. 5A and 5B are block diagrams of example pager cartridges 100 usable in the two-way paging system of FIG. 4.

FIG. 5A is a generalized block diagram of one example pager cartridge 100. Pager cartridge 100 includes an antenna 130 connected to a conventional radio section 132 for receiving and sending messages. While certain features of the system described below utilize the capability of pager cartridge 100 to send messages, it will be apparent that not all features depend on this capability and the present invention is not limited to the use of a two-way pager cartridge. Thus, the present invention contemplates that a one-way pager cartridge may be utilized in some implementations. Notification circuitry 134 provides notification to the user that a message has been received. Notification circuitry 134 may be implemented as a vibration circuit that is controlled by control circuit 136 to vibrate when a message is received. Notification circuit 134 may alternatively or additionally be implemented as a beeper circuit that is controlled by control circuit 136 to beep when a message is received. As suggested, notification circuit 134 may in fact comprise a number of different elements for notifying the user that a message has been received. A user may selectively enable/disable the notification circuit 134 using input circuitry 138. Control circuit 136 controls a display driver 140 to cause display 142 to display received messages. Display 142 may be a liquid crystal display and may be provided with backlighting, if desired. Because pager cartridge 100 is connectable to game machine 10 for communicating messages, display driver 140 and display 142 may be omitted or simplified. A power supply 144 such as one or more batteries supplies power to the components of pager cartridge 100 requiring power. The connections of power supply 144 shown in FIG. 5 are for illustrative purposes only and the need for power by the components of the pager and the manner of supplying the needed power thereto will be readily apparent to those of ordinary skill in the art. Pager cartridge 100 may also be provided with an indicator (not shown) for indicating the power supply level, thereby prompting the user when, for example, new batteries are needed. Alternatively or in addition, a periodic beep (e.g., every 30 minutes) may be generated and output by speaker 149 when the power supply level decreases below a certain level.

Pager cartridge 100 includes a memory 145 for storing software used in the pager operations, including at least some of the various operations described below. It is of course possible to store the software for implementing at least some of these operations in the memory of game machine 10. However, storing such software in memory 145 of pager cartridge 100 facilitates use of the pager cartridge with existing game machines. Memory 145 also stores other data such as available message unit data (message credits), persona character data, messages, etc. Memory 145 may be a combination of read/write and read only memory. Finally, memory 145 may store one or more video game programs that are executable by CPU 26 of game machine 10. Game machine 10 may execute video game programs (including those stored in memory 145) in accordance with one or more instructions contained in received messages.

Pager cartridge 100 is provided with first and second connectors 146 and 148. First connector 146 is configured to permit pager cartridge 100 to be selectively attached and electrically connected to game machine 10 via the connector 40 of game machine 10. In this way, the electronic components of the pager cartridge are accessible to and controllable by CPU 26 of game machine 10 and data (including messages) can be communicated between pager cartridge 100 and game machine 10. Second connector 148 permits game cartridges, read/write memory cartridges, digital cameras cartridges, GPS cartridges and the like to be electrically connected ("piggy-backed") to pager cartridge 100 and, via connector 146 of pager cartridge 100, to game machine 10.

Figure 5B:
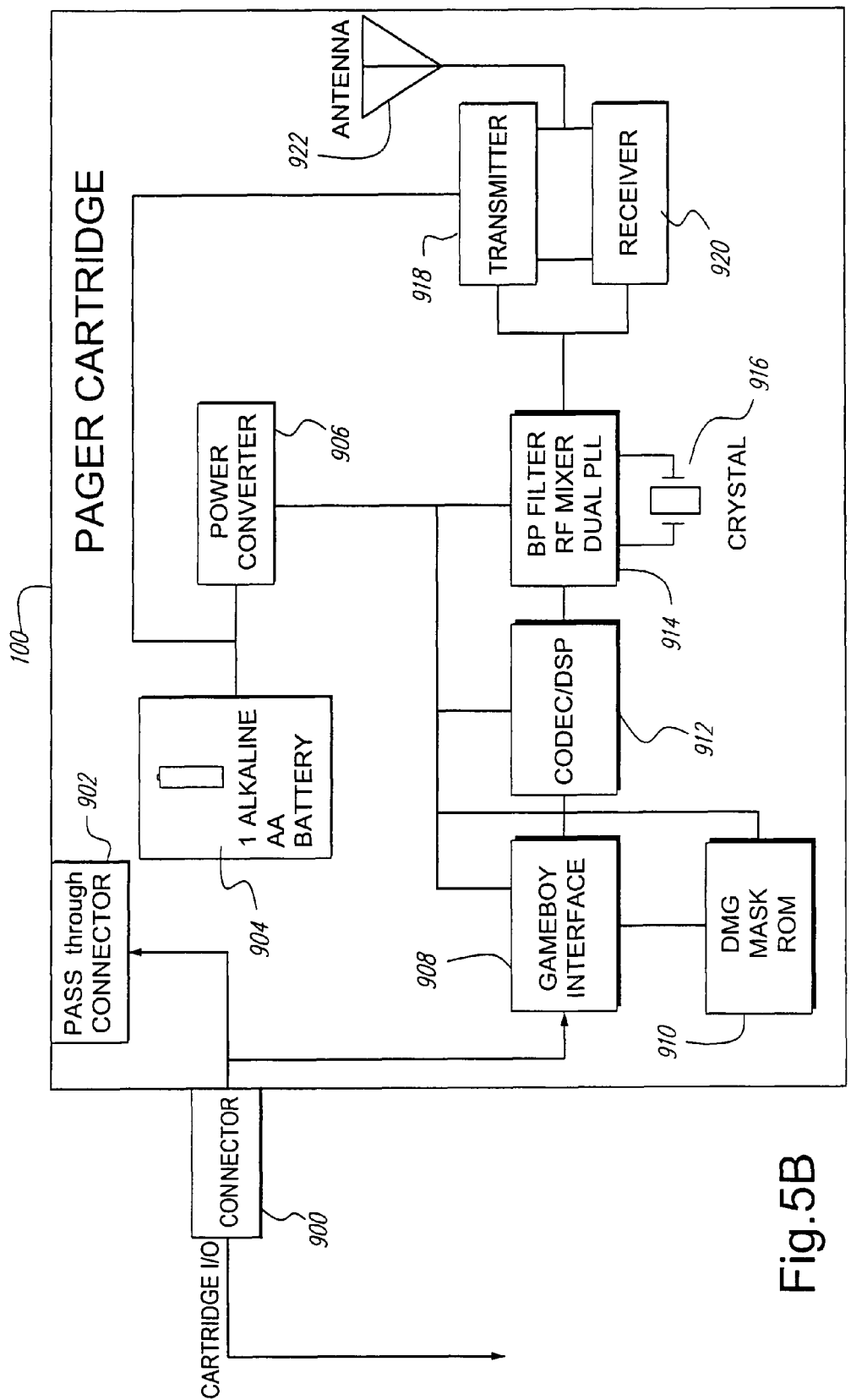

FIG. 5B is a block diagram of another example pager cartridge 100. The example pager cartridge of FIG. 5B includes:
a connector 900,
a pass-through connector 902,
a battery (power source) 904,
a power converter 906,
a game machine interface 908,
a mask ROM 910,
a codec/DSP section 912,
bandpass filter, RF mixer and dual PLL section 914,
crystal 916,
transmitter 918,
receiver 920, and
antenna 922.

Connector 900 connects the pager cartridge to portable game machine 10. Pass-through connector 902 provides a connection to the portable game machine for game cartridges piggy-backed onto the pager cartridge. This allows CPU 26 of game machine 10 to access game programs stored in the piggy-backed game cartridges so that games can be played even when the pager cartridge is inserted into slot 18 of game machine 10. Game machine interface 908 interfaces game machine 10 to the communication circuitry of the pager cartridge and the mask ROM 910 of the pager cartridge. Mask ROM 910 stores various programs that are loaded into the main memory map of the portable game machine. These programs are described in greater detail below. Codec/DSP 912 section encodes/decodes and processes messages transmitted and received by the pager cartridge. Bandpass filter, RF mixer and dual PLL 914 section filters and upconverts/downconverts messages transmitted and received by the pager cartridge. Transmitter 916 transmits messages via antenna 922 and receiver 918 receives messages via antenna 922. Battery 904 provides power for the components of the pager cartridge and power converter 906 converts the power from battery 904 to a level suitable for application to the pager cartridge components. Crystal 916 is used to generate a clock signal usable by bandpass filter, RF mixer and dual PLL section 914.

Example transmitter 916 has the following characteristics:
Frequency bands: 896-902 MHz
Transmit power—1 watt
Bit rate—9600 bps
Channel spacing—12.5 kHz
Frequency stability—0.5 PPM
Signaling—FSK Example receiver 918 has the following characteristics:
Frequency bands: 929-941 MHz
Channel spacing: 25 kHz
Bit rate: 6400 bps
Signaling: FSK Pager cartridge 100 is operable in AWAKE, SLEEP, and OFF modes. In AWAKE mode, full pager cartridge functionality is available. In SLEEP (non-display) mode, pager cartridge 100 has limited functionality, but does operate to receive messages (e.g., marketing information, game information, customer-solicited information, un-solicited information). In OFF mode, pager cartridge 100 is powered down and no functionality is available. The paging system operator (service provider) maintains messages for pager cartridge 100 for a predetermined period of time (e.g., 72 hours). If the user does not place the pager cartridge in the SLEEP mode or the AWAKE mode within 72 hours, the messages will be lost.

Figure 6A:
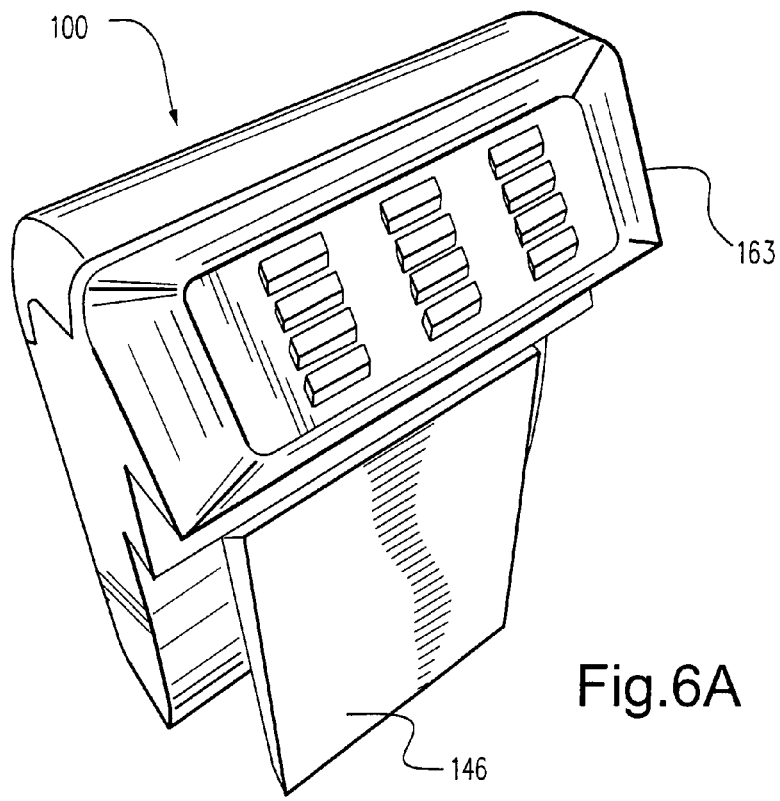
FIGS. 6A-6J show various physical configurations of pager cartridge 100.
Figure 6B:
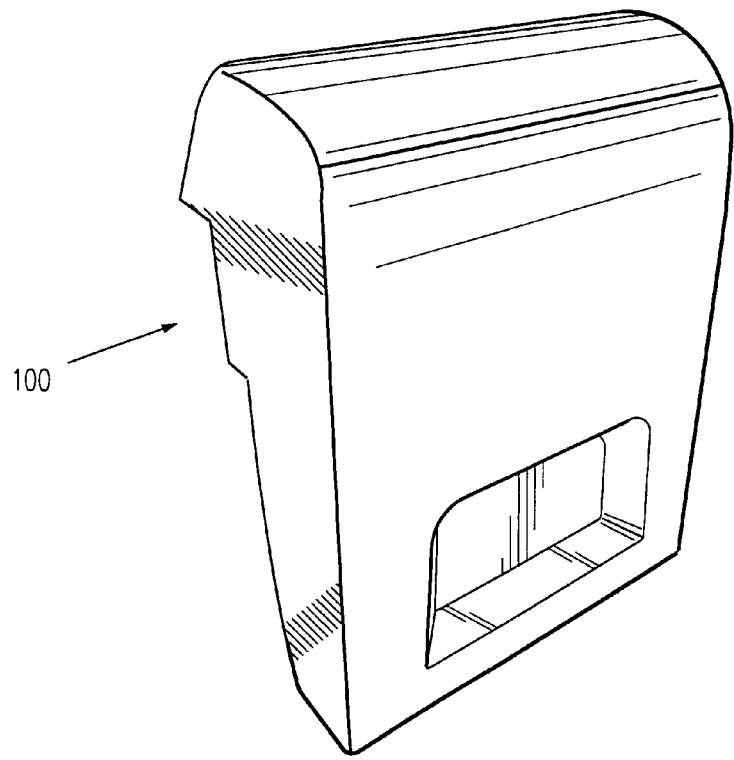
Figure 6C:
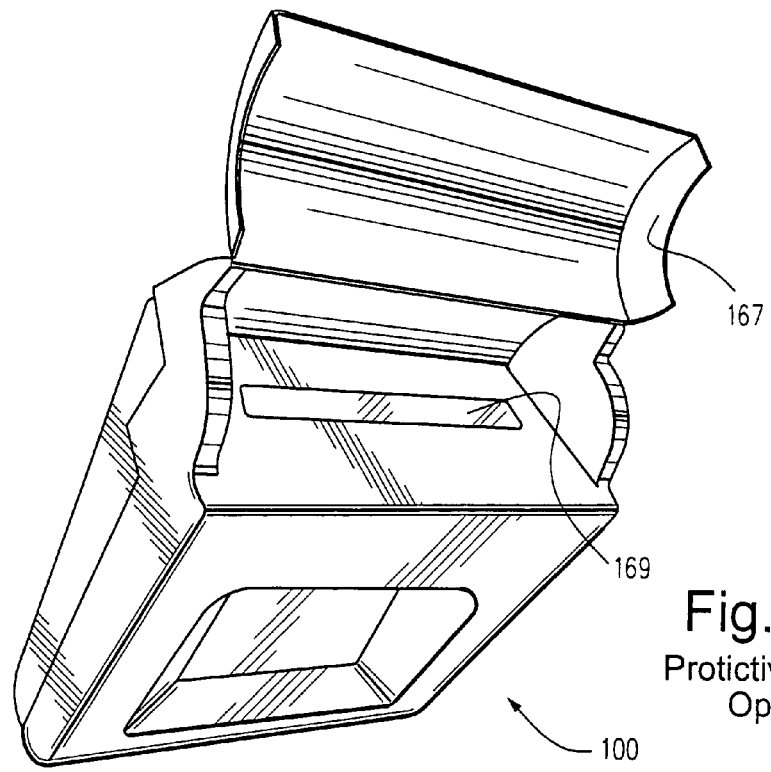
Figure 6D:
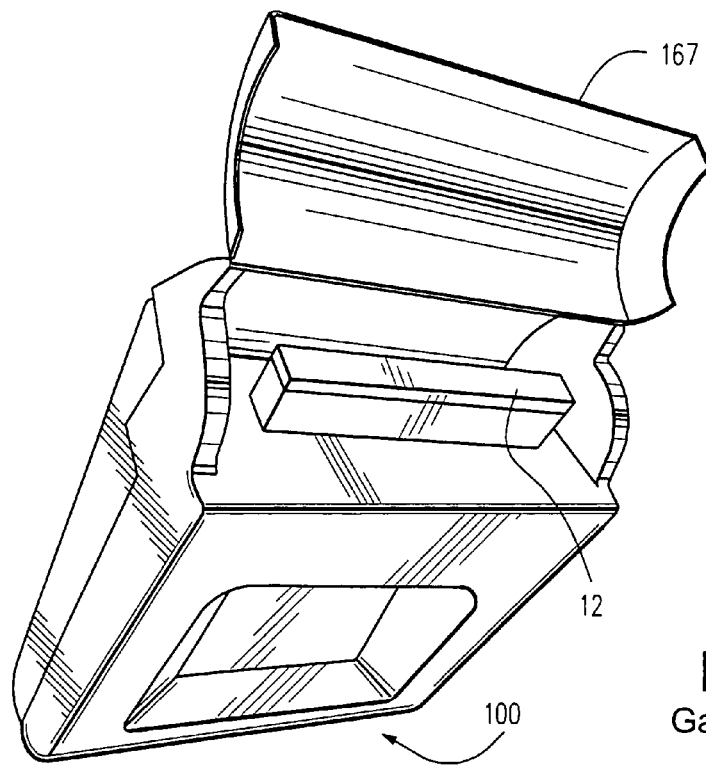
Figure 6E:
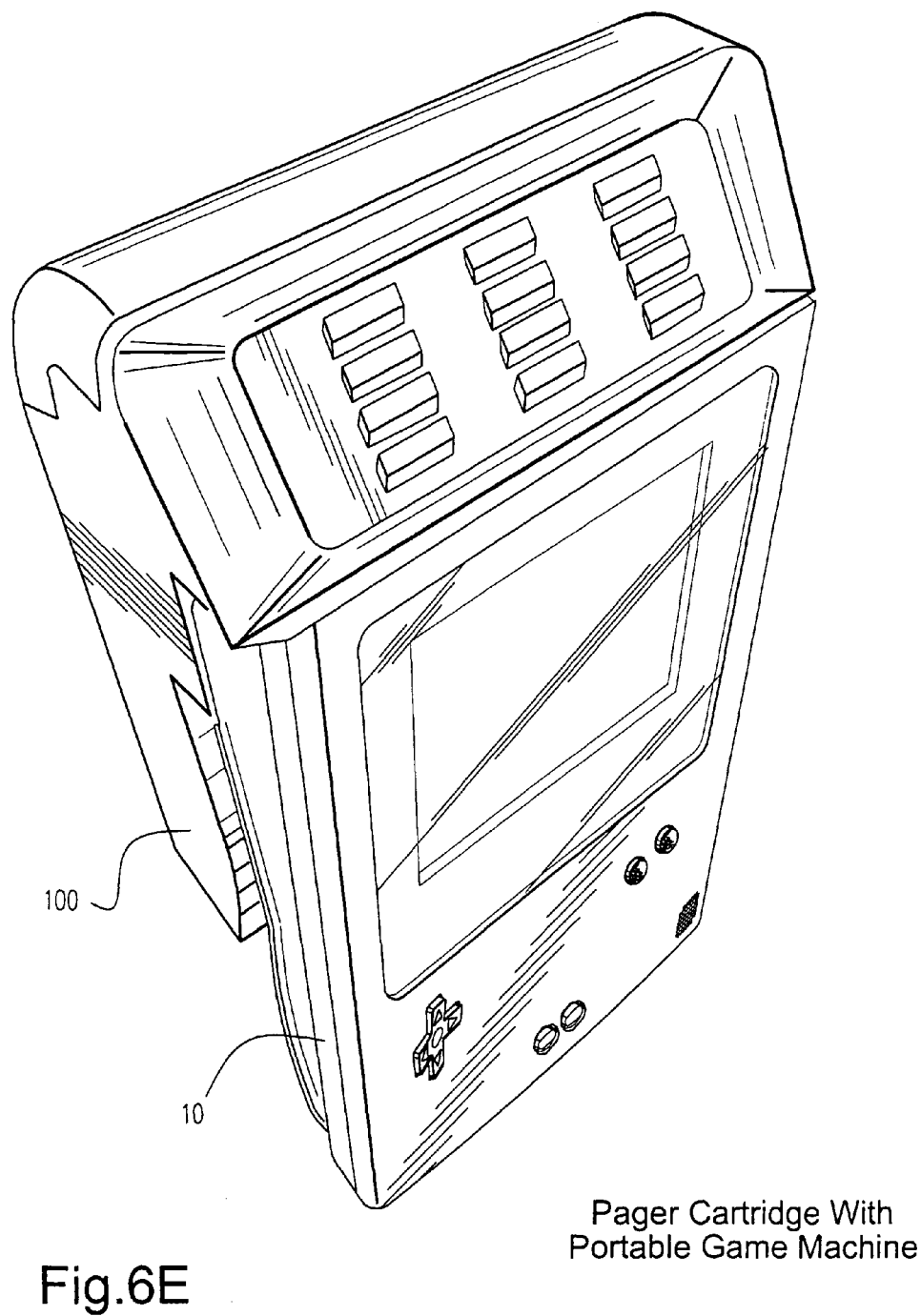
Figure 6F:
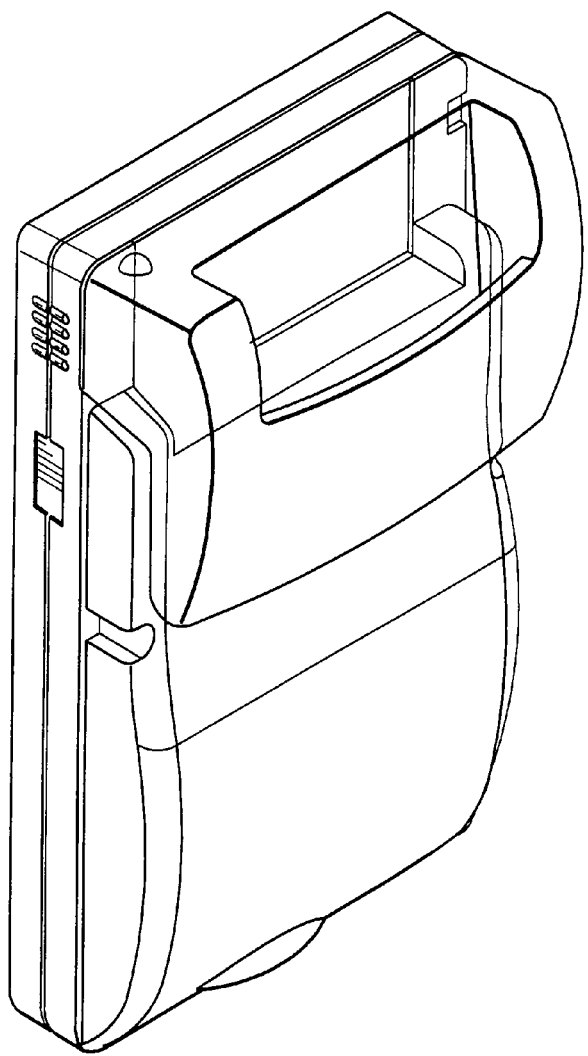
Figure 6G:
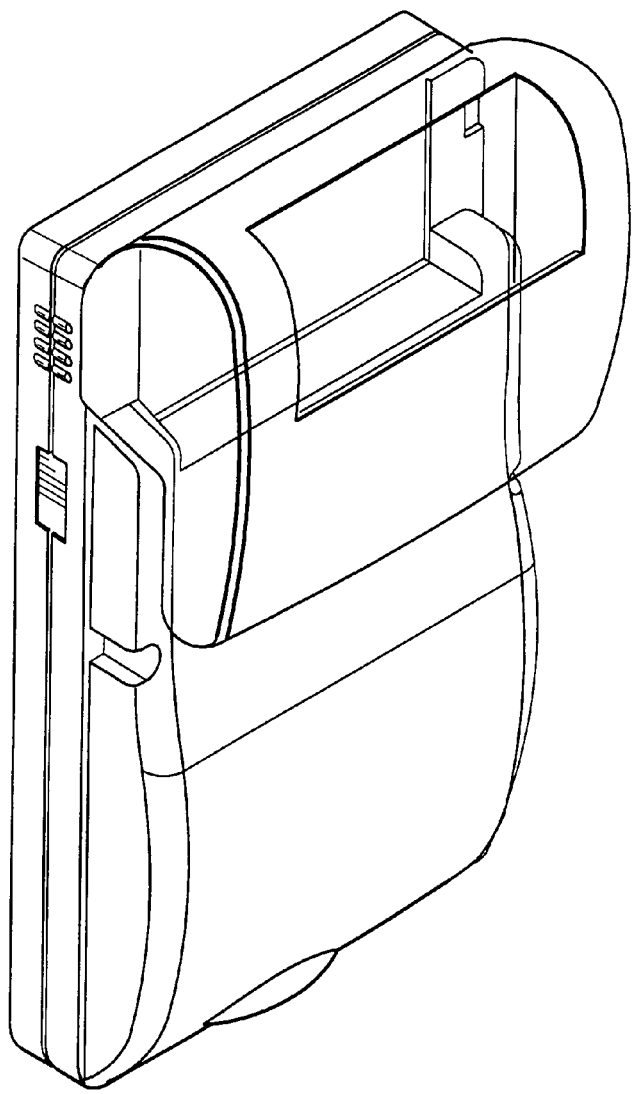
Figure 6H:
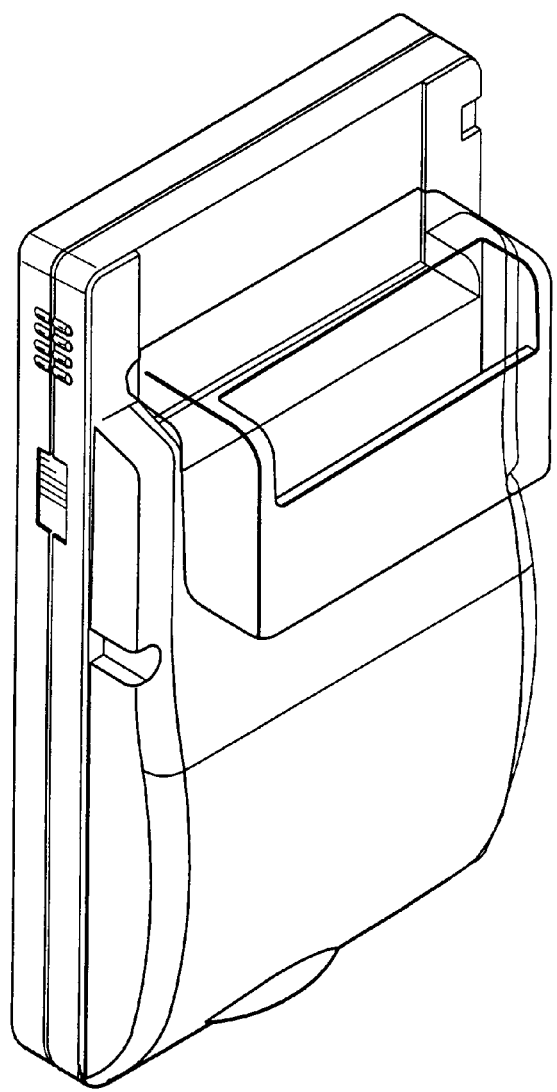
Figure 6I:
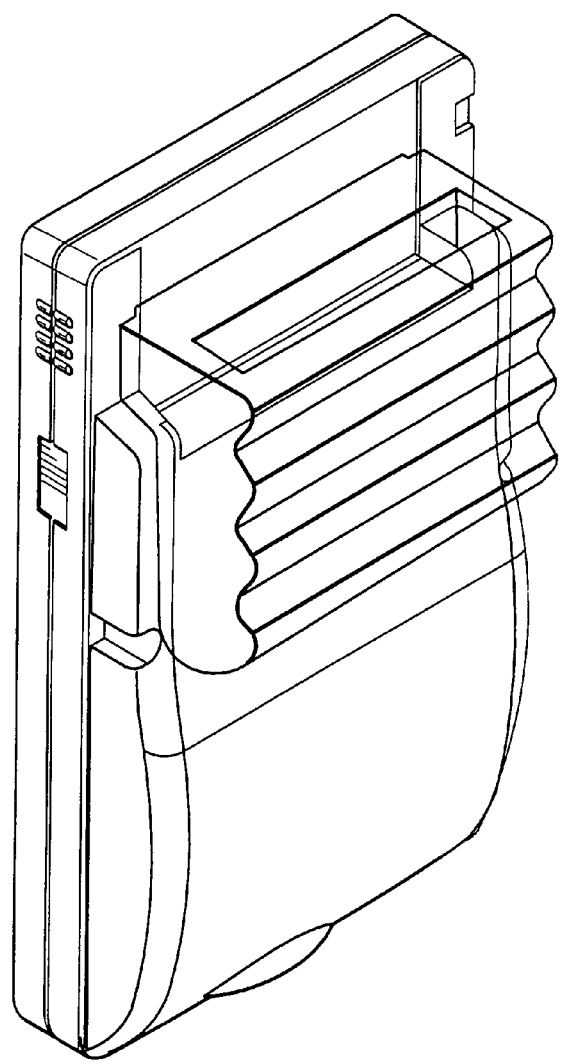
Figure 6J:
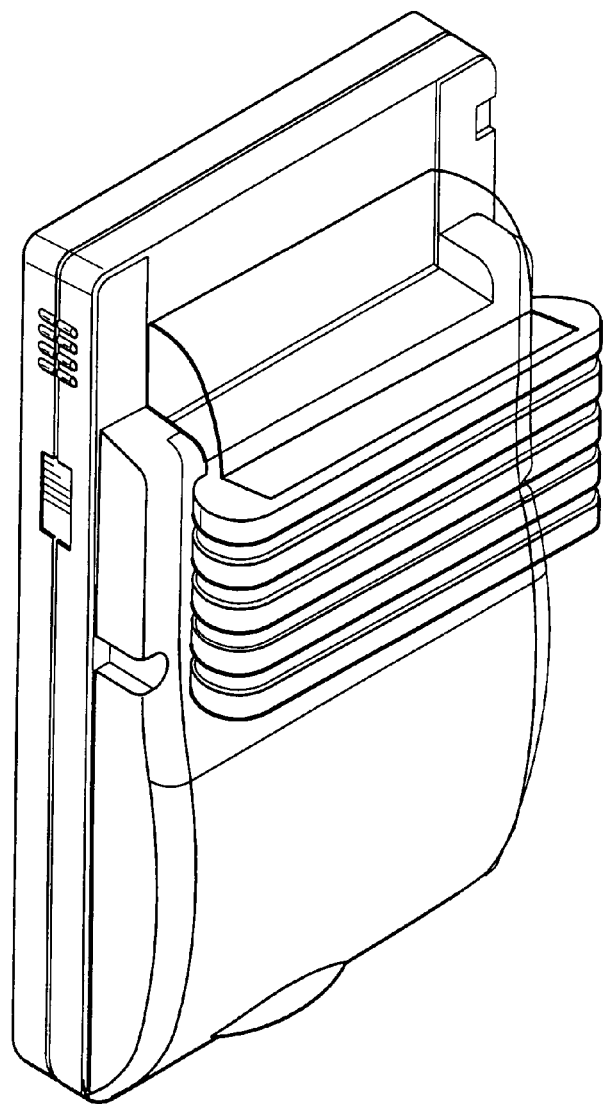

FIGS. 6A-6R show various example physical configurations of pager cartridge 100. FIG. 6A shows a front perspective view of pager cartridge 100 and FIG. 6B shows a rear perspective view of pager cartridge 100. FIG. 6A shows connector 146 for connecting pager cartridge 100 to game machine 10 and a user interface 163. As shown most clearly in FIGS. 6C and 6D, pager cartridge 100 may be provided with a protective flap 167 that is moveable between an open position (shown in FIG. 6C) and a closed position (shown in FIG. 6B). When protective flap 167 is in the open position, a slot 169 is accessible for, in use, receiving game cartridges, read/write memory cartridges, digital camera cartridges, GPS cartridges and the like. FIG. 6D shows a game cartridge 12 positioned in the slot 169. By "piggy-backing" a game cartridge 12 onto pager cartridge 100, a user can use game machine 10 to execute a game program contained on game cartridge 12 even while pager cartridge 100 is attached to game machine 10. This "piggy-back" configuration also allows for different activities to be performed simultaneously (e.g., paging activities and the playing of games). For example, while a player uses the game machine to play a game contained on the game cartridge, pager cartridge 100 can receive messages such as, for example, stock price quotations or sports scores. These messages may be displayed to player during game play (e.g., by a scrolling or overlaying a message (or a "re" line of a message) across display 16 of game machine 10). Alternatively, an indication (such as a graphical message icon) may be provided on display 16 of game machine 10 to indicate to the player that a message has been received. The player can then decide, for example, to suspend (or end) game play and view the message. After the message has been viewed, suspended game play may be resumed. FIG. 6E shows a pager cartridge 100 having the physical configuration shown in FIGS. 6A-6D connected to game machine 10. FIGS. 6F-6J are wire drawings showing various physical implementations of pager cartridges 100 connected to game machine 10.

As noted, the "piggy-back" configuration allows a player to play a game contained on a game cartridge 12 while pager cartridge 100 is connected to game machine 10. In the case in which a read/write memory cartridge is "piggy-backed" to game machine 10 via pager cartridge 100, game machine 10 can read/write data such as high score data, suspended game settings and the like from/to the read/write memory cartridge. Similarly, in the case in which a digital camera cartridge is "piggy-backed" to game machine 10 via pager cartridge 100, digital images may be captured by the camera and used by game machine 10 and/or transmitted as a message using pager cartridge 100. If the digital camera cartridge is configured to capture sounds, these captured sounds may be used by game machine 10 and/or transmitted as a message using pager cartridge 100. Of course, a separate "sound card" may be "piggy-backed" to game machine 10 via pager cartridge 100.

Example Operations

A pager-equipped portable game machine may include (but is not limited to) the following features:
- a plug-in two-way pager,
- sending and receiving of alphanumeric pages,
- sending and receiving of e-mail messages,
- receive broadcasts such as news broadcasts,
- allow playing of pager-compatible games (e.g., network games),
- provide real time clock and calendar,
- play mini-games,
- creation of personal persona, and
- playing of conventional games.

In accordance with one example, pager cartridge 100 provides a two-way paging device that has the ability to receive messages from other users in the paging system as well as from the paging system operator. The pagers in the system are individually and collectively addressable to and from standard telephones, PC-Internet, facsimile machines and other pagers. Messages from the paging system operator may be sent to all users in the paging system, to certain groups of users in the paging system or to a particular user in the paging system. The system operator messages may be transmitted during off-peak messaging hours (such as night-time) when air time and bandwidth are less of a transmission issue and more cost-effective. The system operator messages may include by way of example, but not limitation, mini-games, special game levels, sample games, game tips and hints, system operator information, general game news, advertising, and promotional information. Other messages may include e-mail, stock price quotations, sports scores, news updates, and customer-requested information (e.g., top movies of the week, top songs of the week).

Apart from traditional paging functions, pager cartridge 100 can be used in game playing. It will be appreciated that the system operator does not necessarily generate the game playing content. The system operator may simply provide the paging infrastructure on a contract basis with the game content provider. The game content provider may be a game marketer, a game developer, a game retailer, a game equipment manufacturer, or licensees of any or all of these.

Two illustrative, but non-limiting, applications of pager cartridge 100 to game playing are in Multiple User Dungeon (MUD) games and virtual pets. Generally speaking, MUDs are Internet-based on-line exploration and quest games in which an open-ended number of players simultaneously exist in the same game world, sharing experiences and adventures. MUD games exist in all genres, from fantasy to science fiction and all point in-between, and come in countless formats from text-based to fully graphical. Some currently popular Internet MUDs include Ultima Online (Electronic Arts/Origin), Everquest (Sony 989 Studios), Darkness Falls (Gamestorm/AOL/Kesmai) and Cosrin (AOL). While MUDs vary greatly in appearance and content, MUDs generally share the following key components:
- Exploration and adventure
- Chat and community interaction
- Character growth
- Perpetual, dynamic worlds that grow, adapt and change In one implementation, the user of pager cartridge 100 becomes a player in what will be referred to hereinafter as PagerWorld, a virtual community for the network of all users having pager cartridges 100. Players are represented in Pager-World by a "persona character" and it is this character that all other PagerWorld players will see, for example, when messages are received. Over time, this persona character will become ever more unique to the particular player. As players interact with other players in PagerWorld (e.g., by sending messages and playing games), players will share the fun and excitement of discovering new items, skills and appearances as their persona characters gain experience.

Players read and send messages from the main PagerWorld screen, this screen serving as "communication central." From this screen, the player can choose a portal and actually step into a nation-wide or world-wide community of other PagerWorld players. PagerWorld is the hub for communications, becoming a central meeting place to find friends and share messages. Visually, it can be thought of as a carnival midway where players walk their persona characters in a world featuring attractions and sideshows. Players can find pen-pals, view message boards, check high-score lists and play games with others. PagerWorld also contains games and quests with prizes for victorious persona characters.

Via downloads from the system operator at regular intervals, new areas of PagerWorld may open, revealing new games and quests. Players can explore new lands and find items or powers for their persona characters that will be unique to them. PagerWorld can be implemented in a manner that emphasizes the growth and daily care of a player's persona character. The player can care for his/her persona character as he/she would care for a virtual pet, as well as participate with others to improve the skills and add to the virtual possessions of the persona character.

Figure 7:
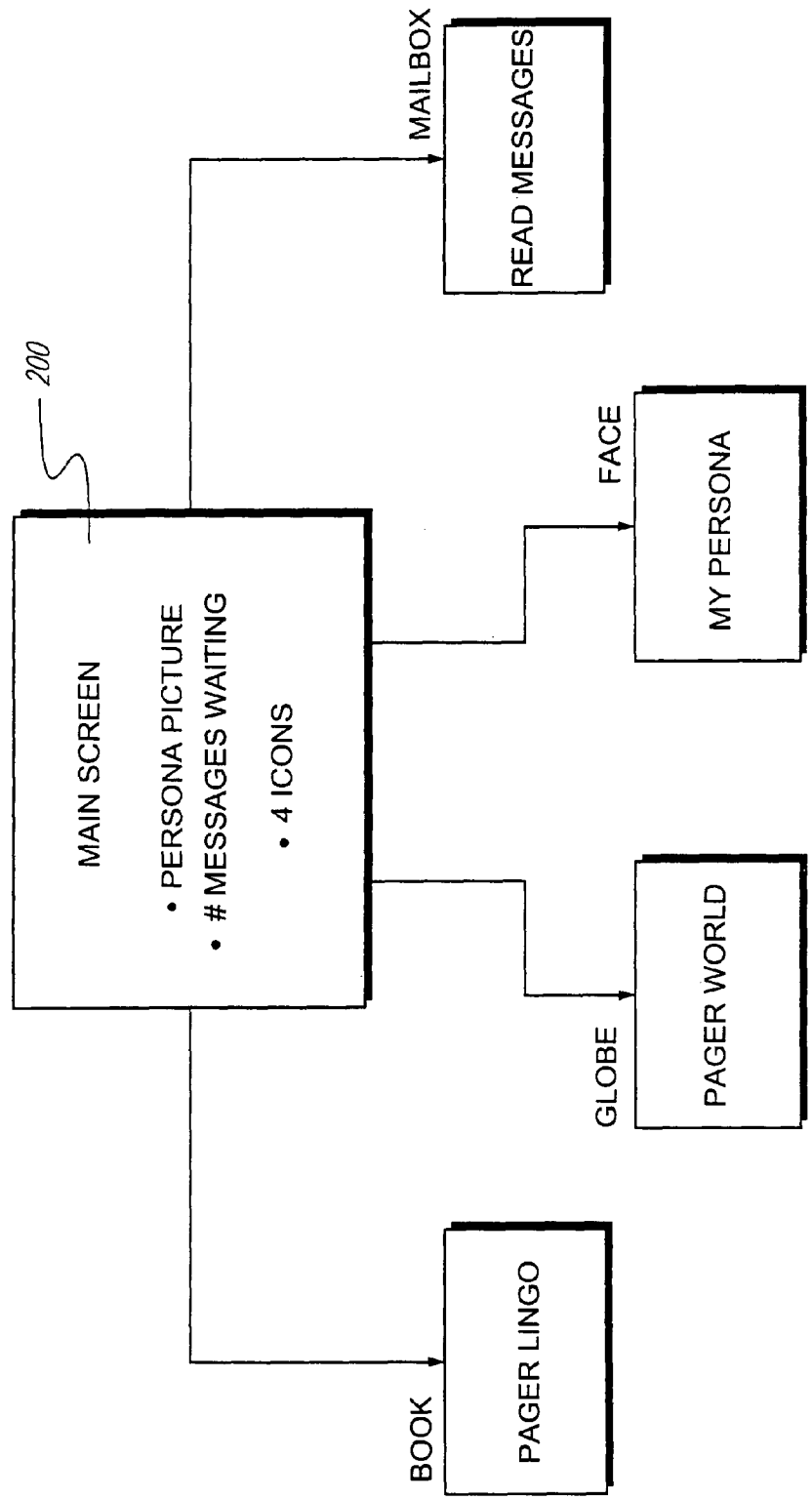
FIG. 7 is a conceptual block diagram of an interface for pager cartridge 100 when it is connected to game machine 10.

FIG. 7 is a conceptual block diagram of an interface for pager cartridge 100 when it is connected to game machine 10. Turning on pager cartridge 100 when it is connected to game machine 10 takes the player to a main PagerWorld screen 200. This screen is the starting point for every user session. First, the player is greeted by his/her persona character. The representation of the persona character may be present on each screen throughout the session. The persona character may in fact be the featured element on the screen and function as a sort of "pager" tour guide.

Figure 8A:
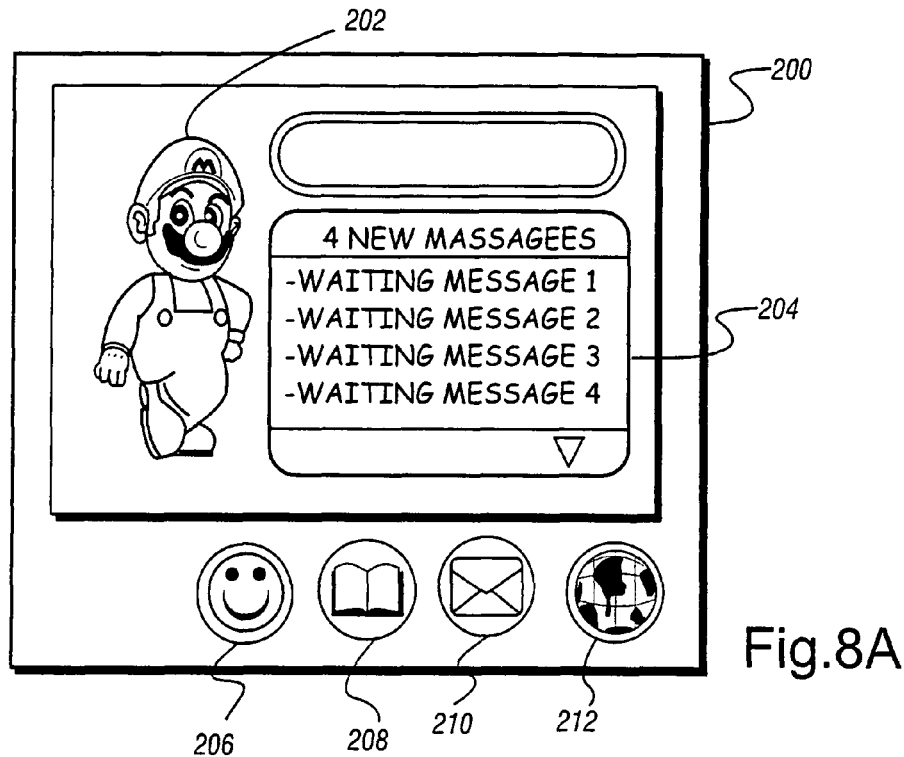
FIGS. 8A-8H show various screens that are part of the interface conceptually shown in FIG. 7.

FIG. 8A shows an illustrative, but non-limiting, implementation of the main screen 200. Along with the player's persona character 202, main screen 200 includes a dialog box 204 informing the player about the number of incoming, unread messages and other status indicators and four icons 206, 208, 210 and 212. Icon 206 ("My Persona") is a face; icon 208 is a book ("Pager Lingo"); icon 210 is an unopened envelope ("Message Center"); and icon 212 is a globe ("PagerWorld"). These icons provide the player four choices.

Figure 8B:
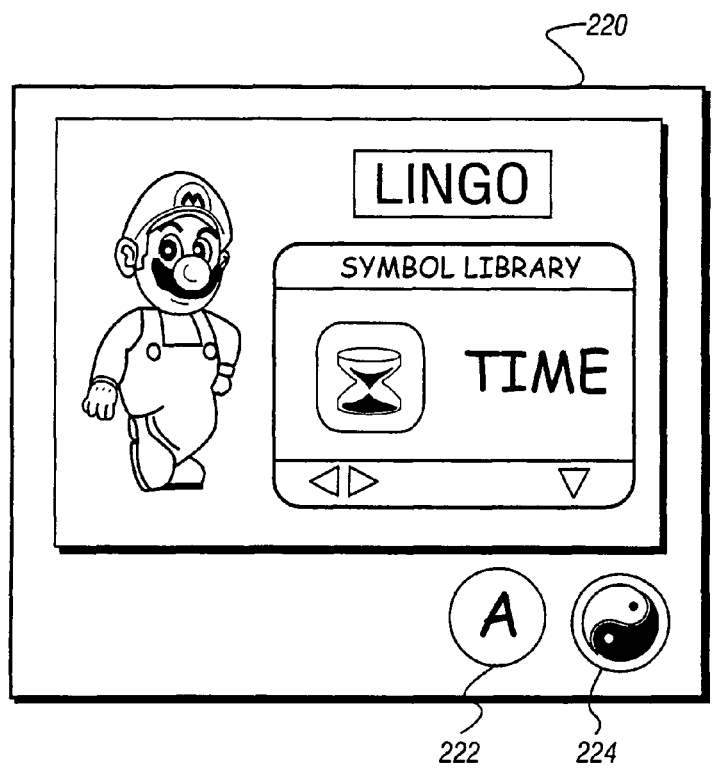

Selecting book icon 208 (e.g., via appropriate manipulation of one or more of operating keys 48a-48e) brings the user to a screen 220 shown in FIG. 8B. Screen 220 permits the user to review their dictionary of words and symbols. Players can trade word symbols, build phrases and decode messages. This "personal language" is important to communication between players of PagerWorld. Players can create encoded messages as well as use symbols to represent entire phrases, hence streamlining their messaging and reducing message costs. Icons 222 and 224 permit the user to create associations between words/phrases (e.g., phone) and symbols (e.g., ). The symbols may, for example, be symbols obtained from messages, from the memory of the game machine or from a read/write memory cartridge or a game cartridge piggy-backed onto pager cartridge 100. The words or phrases may be generated using, for example, a virtual keyboard displayed on display 16 of game machine 10 and selections made using one or more of operating keys 48a-48e.

Figure 8C:
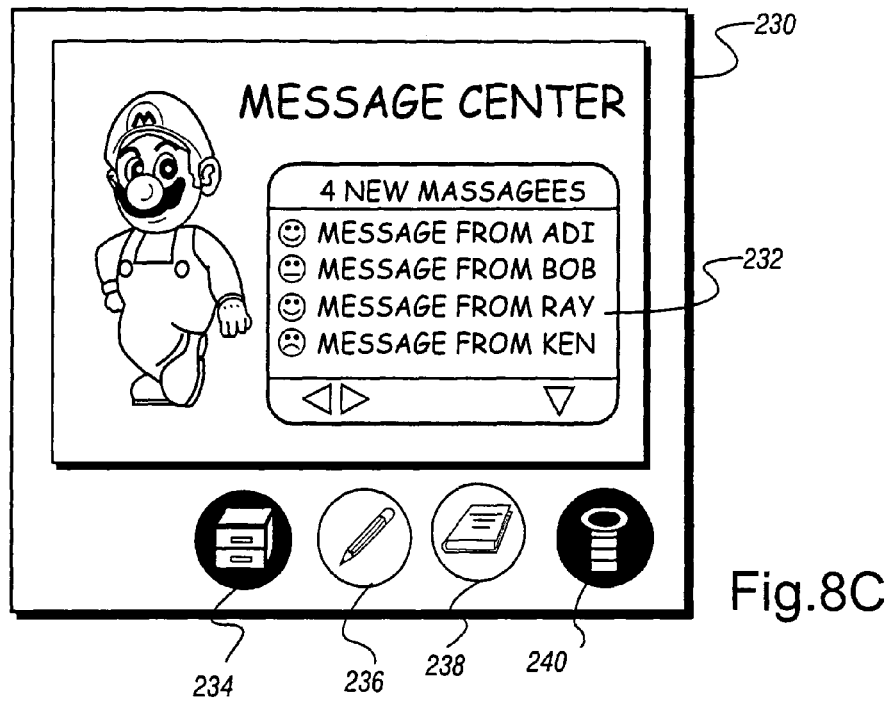

Selecting an unopened envelope icon 210 brings the user to a screen 230 shown in FIG. 8C. Screen 230 is the "Message Center" and permits users, among other things, to read their messages and to compose and send new messages. The Message Center screen features a window 232 that lists unread messages. Selecting a message takes the user to a Read Message screen 250 shown in FIG. 8D. Message Center screen 230 contains four icons: a File Cabinet icon 234; a Quill icon 236; an Address Book icon 238; and an Account Meter icon 240. Selecting File Cabinet icon 234 takes the user to a File Cabinet screen 270 shown in FIG. 8E; selecting Quill icon 236 takes the user to a Compose Message screen 290 shown in FIG. 8F; and selecting Address Book icon 238 takes the user to an Address Book screen 309 shown in FIG. 8G.

Account Meter icon 240 is a graphical representation of the user's account balance. As messages are sent, this meter will decline. As new message time ("airtime" or "message credits") is purchased (as will be described in greater detail below), the meter will increase accordingly. Of course, the meter is but one way of displaying data indicative of the user's account balance and it will be apparent that other textual and graphical representations may be used. A graphical or textual reminder to obtain additional message credits may be generated on display 16 of game machine 10 when the user's account balance decreases below some predetermined amount.

Figure 8D:
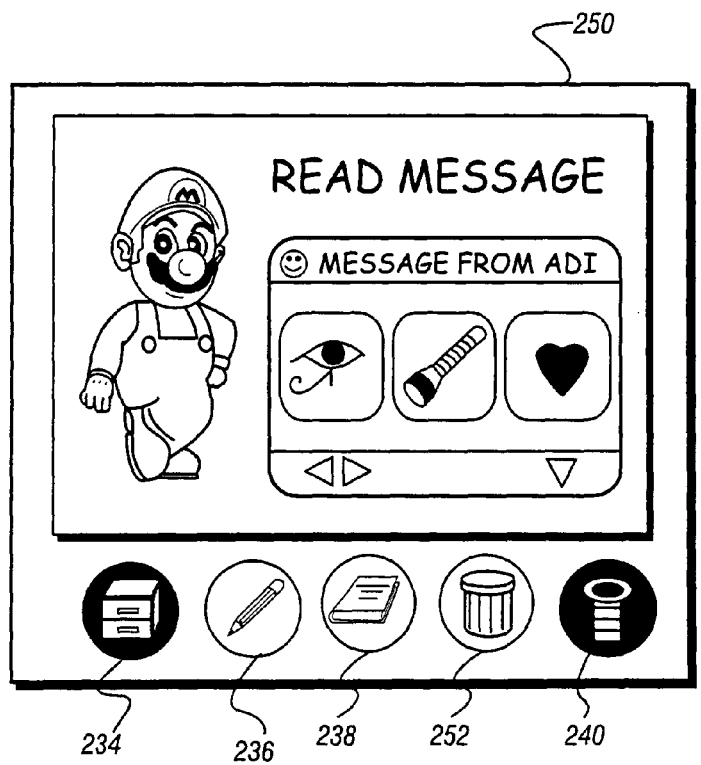

Read Message screen 250 is shown in FIG. 8D. When a message is selected from Message Center screen 230, the contents of the message appear, along with the user's persona character and "handle" of the person that sent the message. Throughout the Message Center operations, the displayed icons generally remain consistent. However, when a user accesses Read Message screen 250 to read a message, a Trash Can icon 252 also appears. Trash Can icon 252 allows users to discard messages they do not wish to keep. The system may, if desired, be configured to provide a message archiving feature in which a user may archive messages to a read/write memory cartridge piggy-backed into pager cartridge 100.

Figure 8E:
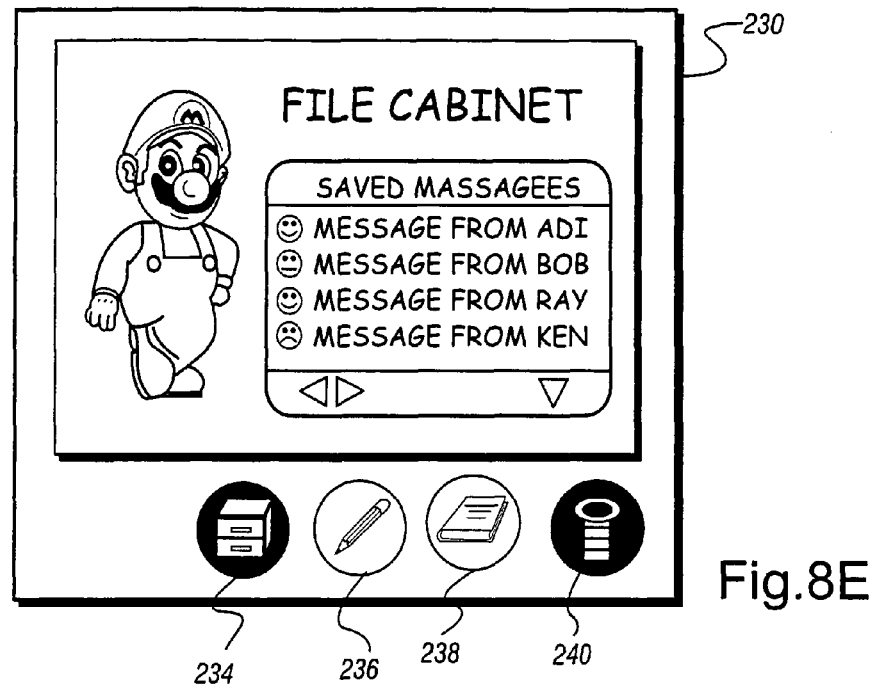

File Cabinet screen 270 is shown in FIG. 8E and is similar in appearance to main Message Center screen 230. File Cabinet screen 270 displays a list of saved messages. In some implementations, the saved messages may be organized by topic. Selecting a message opens up the message in Read Message screen 250 of FIG. 8D.

Figure 8F:
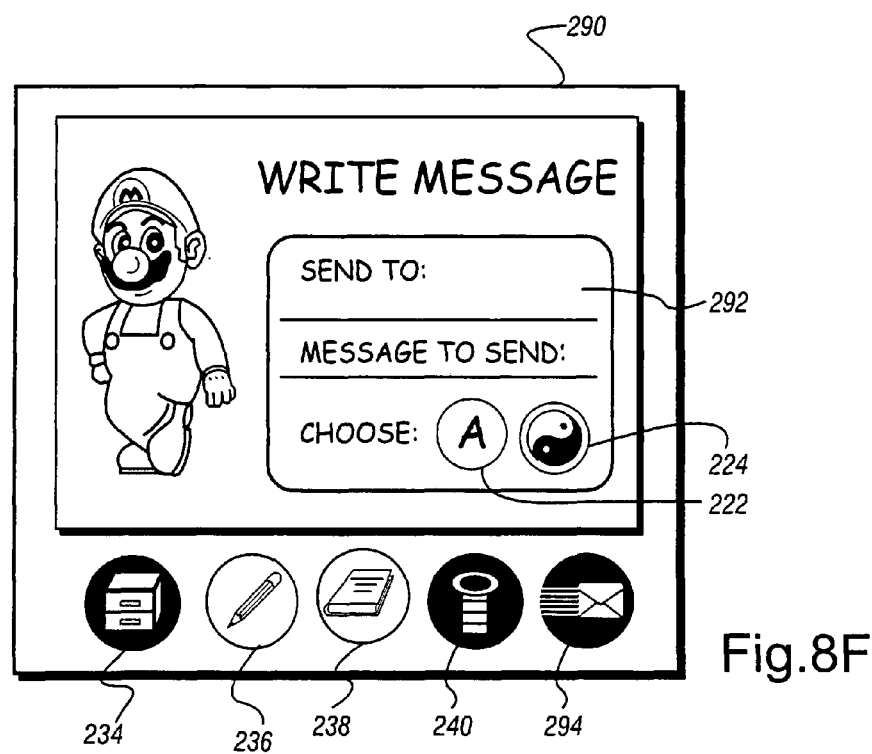

Compose Message screen 290 is shown in FIG. 8F and permits a user to construct a message by choosing letters or by selecting symbols from his/her dictionary of lingo symbols using icons 222 and 224. As noted above, letters may be chosen using a combination of a virtual keyboard displayed on display 16 of game machine 10 and user inputs via operating keys 48a-48e. A "Send To" window 292 allows the user to choose to whom the message will be sent. Users can type in another user's handle or choose from the listings in their address book. A "Send Message" icon 294 also appears and allows the user to send the composed message using the radio circuitry of pager cartridge 100.

Figure 8G:
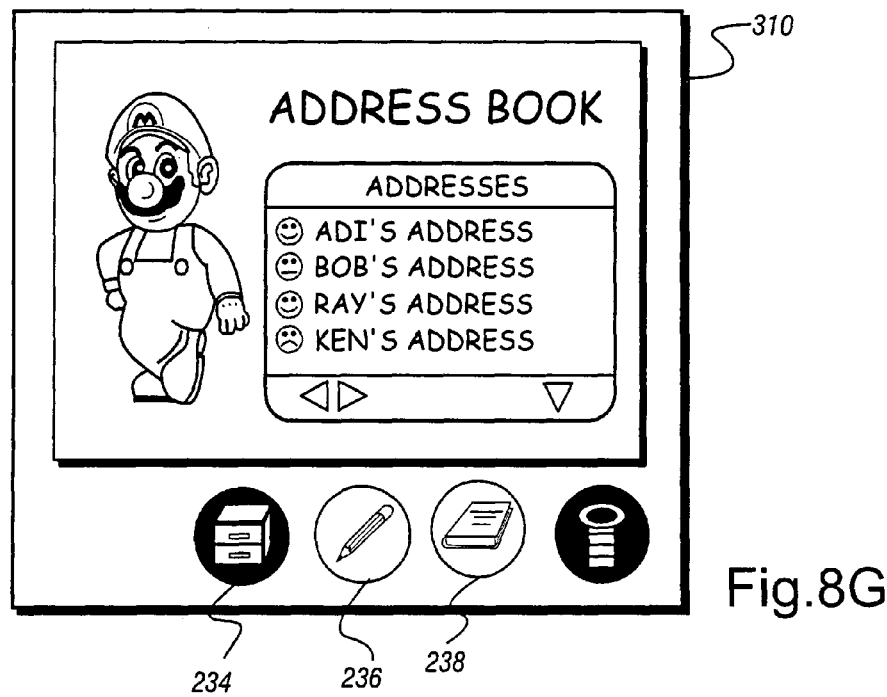

Address Book screen 309 is shown in FIG. 8G and provides a listing of other users by their handles. Next to each handle is the persona character of the other user as it appeared on his/her last communication with the user.

Figure 8H:
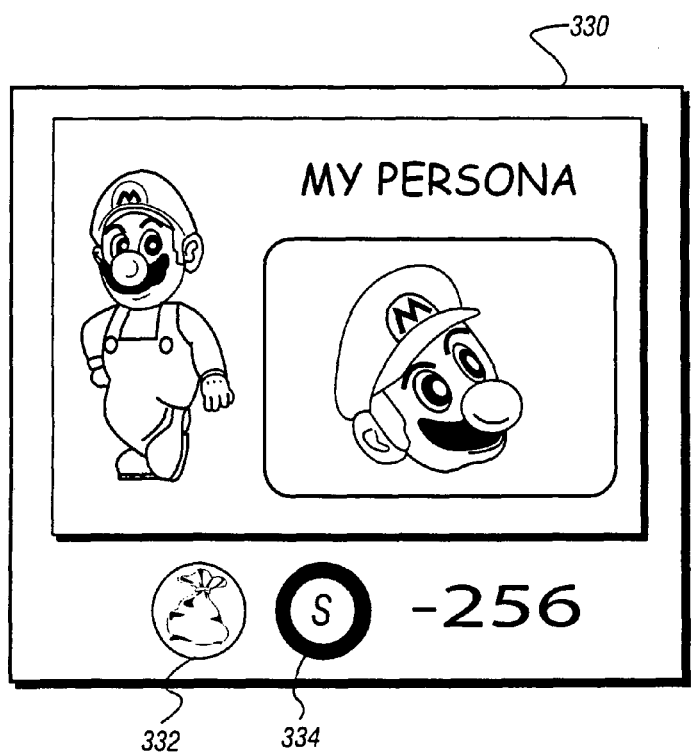

With reference again to Main Screen 200 shown in FIG. 8A, choosing Face icon 206 takes the user to a "My Persona" screen 330 shown in FIG. 8H. Here, a user may customize his/her persona character to his/her liking. A Bag icon 332 may be selected to show the user his/her inventory of items that can be purchased or discovered on mini-adventures. A Coin icon 334 shows the number of coins that the user has collected over time. The system also includes a "Handle Maker" option that permits a user to alter their face (i.e., hair, node, eyes, mouth, etc.). This capability may be implemented so that it can be accessed only at "boot-up" or it may be implemented so that it is accessible at all times via the interface. The player can simply choose what items he/she would like to be wearing and how he/she would like his/her persona character to look. As the persona character gains experience, hence coins and possessions, its look will become ever-more customized. Any time the user sends a message, his/her persona character appears alongside the message on the other user's screen. It is even possible to customize the persona character using image data obtained with a digital camera cartridge.

Figure 9A:
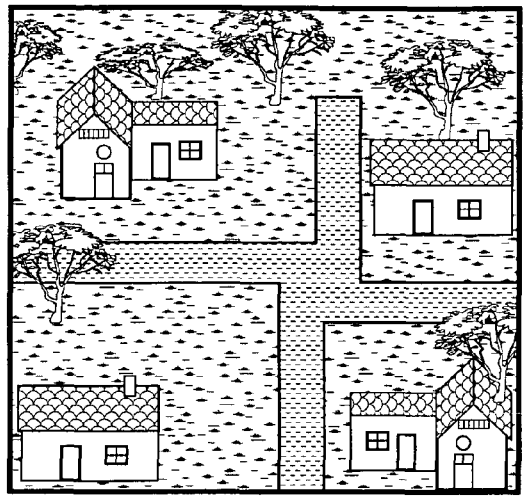
FIGS. 9A-9C show various screens in PagerWorld.
Figure 9B:
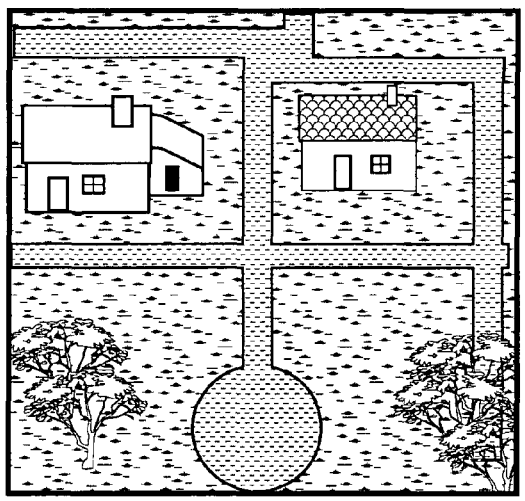

Again with reference again to Main Screen 200 shown in FIG. 8A, selecting Globe icon 212 from Main Screen 200 transports the user's persona character into PagerWorld. The implementation shown in FIGS. 9A and 9B is a top-down view into a city in which the player can freely roam. At the center of PagerWorld is the "Midway." The Midway is a stretch of road that features several buildings. Players can move their persona characters through PagerWorld using operating keys 48a-48e, for example, and enter buildings freely. Illustrative, but non-limiting examples of buildings that may be included in PagerWorld include:

The Newscenter—This building permits a player to view news from the service provider and to customize the amount and/or type of news downloaded to the pager cartridge by the system operator, for example, each night.

The Hub—This building is a place to learn the names of other players and strike up a pen-pal communication.

The Store—This building permits the player to purchase various items for the persona character such as hats and clothing.

The Gaming Center—The building permits players to meet and play games, view high scores, etc.

As noted, this list of buildings is intended to be illustrative, not limiting. The full design of PagerWorld will generally incorporate many other elements to take full advantage of the system in order to create a community feel.

At regular intervals, PagerWorld is updated. In one implementation, these PagerWorld updates are communicated to pager cartridge 100 via night-time downloads when pager cartridge 100 is in SLEEP mode. When this occurs, new areas are made available for the player to "adventure" within. These side-quests or mini-adventures allow players to explore in order to collect coins and acquire unique items and skills. These new areas may become a permanent part of PagerWorld or may be available for limited periods of time (e.g., one week, one month, etc.).

The game design for the mini-adventure may take the form of stand-alone RPG/adventure and a series of transmissions in the form of "choose-your-path" multiple-choice decisions. The player moves through the new areas in search of the proper path to the best possible ending, with their decisions shaping how the adventure unfolds.

Figure 9C:
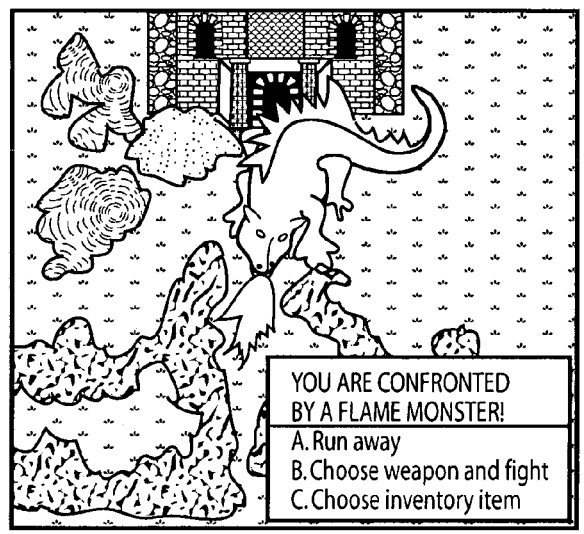

For example, suppose when a player of PagerWorld wakes up and connects pager cartridge 100 to game machine 10, he/she is informed by a message that the "Haunted Castle" is now open in PagerWorld. Upon entering PagerWorld using the above-described interface, the player would notice that a new pathway had opened up, leading straight to a spooky tower on the outskirts of the midway as shown in FIG. 9C. During the course of the adventure, the player might encounter a fire monster that stands before a critical juncture. The action taken by the player at this point may depend on the situation and the experience of the persona character (e.g., does the persona character possess a water sword to slay the beast?). Depending on these factors, the player may control his/her persona character to fight, flee or use some item in the player's possession. The player makes a choice and sends it back to the system operator via pager cartridge 100 in the form of a message. The consequences of the player's decision are sent back in a message from the system operator via pager cartridge 100 and the adventure continues. Each adventure generally comprises a predetermined number of messages between the player and the system operator (e.g., 8-10). There are several possible endings, some yielding coins, others yielding items or other surprises. The adventures may also incorporate the following illustrative, but non-limiting, ideas:

- A limited number of the "best awards" per new adventure (e.g., only 20 players will win the special item)
- Teamwork-based adventures requiring input from multiple players with complementary skills
- Tile-based worlds require small downloads. The tiles already exist within pager cartridge 100 or game machine 10.
- Additional "adventure paks" could be sold, containing new tile sets, sounds and item graphics.

Figure 10:
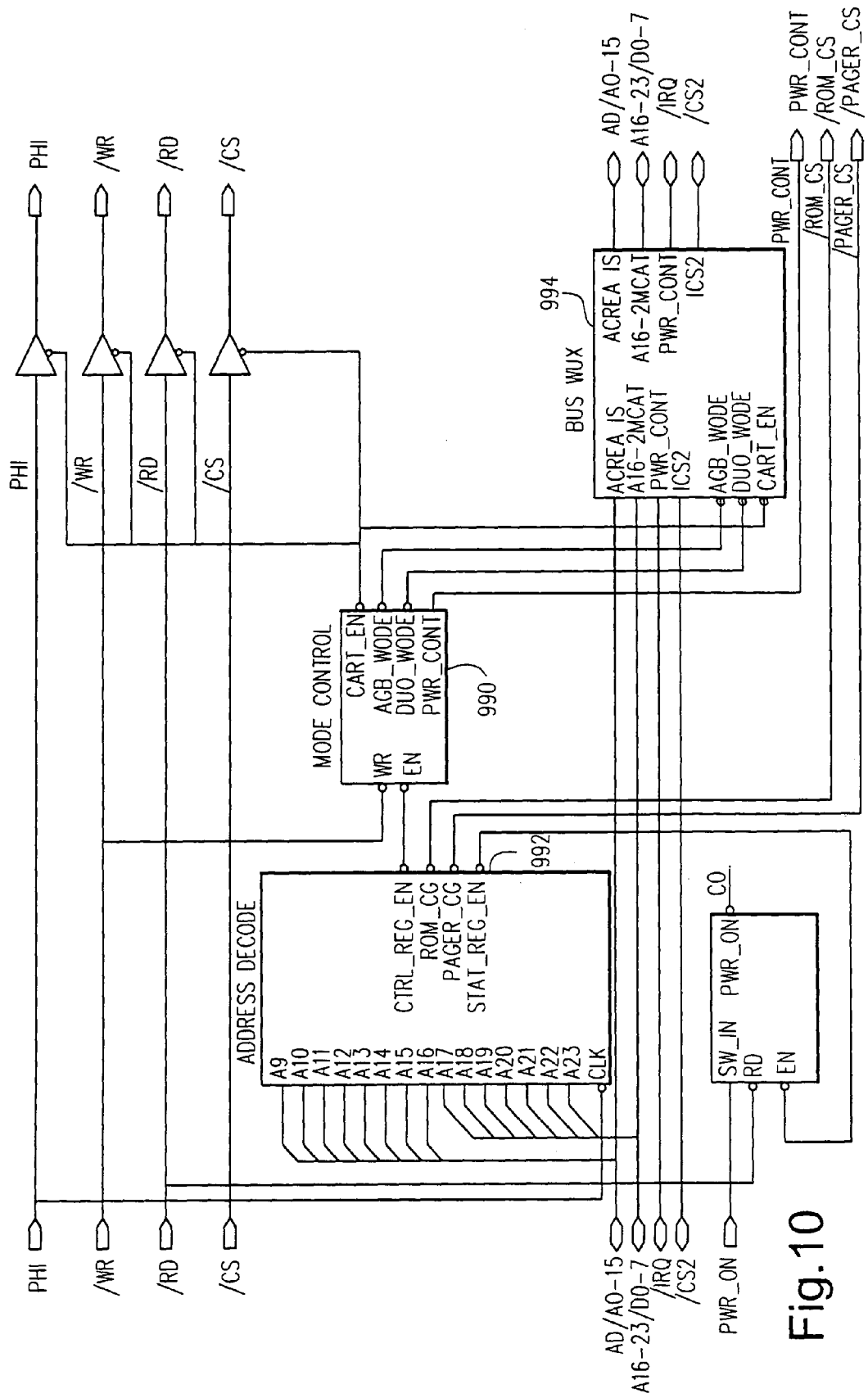
FIG. 10 is diagram of an example bus multiplexer and address decoder usable in pager cartridge 100.

When the portable game machine and the attached pager cartridge are turned on, the main PagerWorld screen 200 is displayed. The users can then go to different places (i.e., send a page, read news, play games) as described above. In an example implementation using the pager cartridge shown in FIG. 5B, these programs are stored in ROM 910. The programs and their I/O portions are loaded into the memory map of portable game machine 10 so as to be accessible to CPU 26 of portable game machine 10. Game machine interface 908 interfaces between pager cartridge 100 and portable game machine 10. When a game cartridge is piggy-backed onto pager cartridge 100, users can play the game independently via pass-through connector 902. This capability may be provided using a switching mechanism that enables appropriate communication of signals between portable machine 10 and the game cartridge when the game cartridge is piggy-backed onto pager cartridge 100. An example of such a switching mechanism that includes a mode control circuit 990, an address decode circuit 992 and a bus multiplexer 994 is shown in FIG. 10. During game play using a non-pager-compatible game cartridge, if pager cartridge 100 receives an incoming message, the user is notified. The users can then retrieve the message by disconnecting the game cartridge from pager cartridge 100. During game play using a pager-compatible ("pager-aware") game cartridge, incoming pages may be processed or responded to immediately.

Example Intervention

The portable game machine equipped with a pager cartridge as described above has the ability to wirelessly intervene in a video game either by result of a player solicitation or an unsolicited action from another player (using a similar pager-equipped portable game machine) on the fly—wherever the portable game machine is operational. Because is a "message" is not real-time, but delayed time, the interventions are magical, fun and, by nature, unpredictable. Interventions allow players to equalize skills in games, making games more competitive. Interventions can be solicited or unsolicited. An illustrative solicited intervention is a player requesting help from a friend playing the same game. A player could, for example, request a ladder to climb a wall to gain a prize or level or request more ammunition to fight enemies. An illustrative unsolicited intervention is multiple players playing the same game and sending "messages" to each other to disrupt game play and slow competitors down. A player could, for example, destroy a bridge that a heroic game character must cross to rescue a princess (thereby forcing another player to use another route). A player could blow up an ammunition dump, depriving a competitor of ammunition needed to win a battle (forcing the competitor to change game tactics in order to survive).

The element of consequences to a solicitation adds additional intrigue for users—players have to determine the value of what they will get for what they must trade in. Solicited interventions may, for example, have a consequence (or cost) associated to it. For example, if a player requests a ladder, the player could trade an item for the ladder or give up coins. In the case of unsolicited interventions, a game can have hidden "supplies" available only for interventions in order to add more fun, complexity and mystery to the game. To discourage abuse, game supplies could be restricted to a quota of interventions per level or game to reduce messaging costs to player.

The use of intervention requires that players know each other's address and are playing the same game. Typically, this is relatively simple for users to coordinate. Games may be provided with built-in capabilities to send and receive interventions from pager-equipped portable game machines even though they may be great distances from each other. Similarly, this technique could be used in "guest" games, where players may be blind to each other. They would have to identify each other by address in order to play. This could be accomplished by a bulletin-board service and player sign-up roster. Additionally, a game content provider could intervene in games automatically by having background pager messages generated by players during game play that are sent to the game content provider. These messages would result in a "tactical" return message from the game developer that would "magically" modify their game. This element of surprise can be challenging, fun and rewarding for players. To avoid unwanted message charges that might result from such background messages, the user is preferably permitted to enable/disable this capability and/or to set some limit to the number of such messages that is generated during game play. This limit may be on a per game basis (e.g., 10 total background messages for the game), a per game level basis (2 background messages for each level of the game), a per game playing session basis (e.g., 2 background messages each time a user plays the game) or a real time basis (e.g., 3 background messages per week).

Example Embedded Game Codes and Tactics

Embedded game codes, characters and information provide opportunities for outside assistance, changes and actions. The result is features that extend game longevity, add to player enjoyment and increase playability.

Player Identification/Address

Pager compatible games played with pager-equipped portable game machines may be configured to automatically capture a player's address and persona information. The ability to capture and transmit a player's address and persona information can enable communications (e.g., to and from other players, to and from a game content provider, etc.) that are (or appear to be) on an individual basis.

Moves

Programmers can embed special moves and items that can only be activated by "messaging" and expand game play options. These special moves/items will have value that could increase game scores or other rewards. This option can replace or supplement traditional game codes that are normally posted in guide books and web sites. For example, special messages from a game content provider may activate special desirable/undesirable moves or items encouraging players to leave their pagers on overnight to receive the "mysterious" special messages.

Levels and Paths

As with moves, new levels and paths can be secretly stored to enhance game play, increase scores and rewards. Levels could be activated by messages from a game content provider.

Characters

Programmers can build in secret characters that can only be turned on by a message from a game content provider. These characters, after activation, could be captured and traded to other friends between pager-equipped portable game machines or by a game link cable. The new characters could have special powers to help players overcome obstacles in the game. For example, to gain access to levels or get important game information, users could use a special character. When the user tries to access this level without the special character, a message may appear in either a hint or riddle to indicate to players that they must obtain and use the special character to gain access.

Auto-Messaging

With the ability to capture user information, as players play their pager-compatible games, background messages could be sent to a game content provider or to other players as they progress through the games. If such messages are sent to a game content provider, the game content provider could respond uniquely and directly to players. This creates opportunities for the game content provider to intervene appropriately at various stages of the game to insert changes, tasks or characters and to enhance game play. Two or more people playing the same game could have different game experiences at the same time.

As mentioned above, to avoid unwanted message charges that might result from such background messages, the user is preferably permitted to enable/disable this capability and/or to set some limit to the number of such messages that is generated during game play.

What Next?

This feature provides an opportunity or ability for players to request help from a game content provider. This is essentially an on-line "help" option—and at the end of the game, users would see if they finished without getting any help at all. For example, a "Help" sign post could exit throughout (or at certain times during) a game. When the user clicks on the "Help" sign post, they could get information about the best route to follow, how to defeat the enemy, etc.

Randomly Hidden Collectibles

Hidden collectibles can be put into the game that are activated by messages, both solicited and unsolicited. These could be traded with friends and competitors. Some collectibles could be dangerous to game play, others beneficial. A random (or seeded) process may be used for the characters. Thus, not all game would have the same capability to receive characters or adventures. This would encourage players to message other players to receive or get rid of desirable/undesirable collectibles. This enables the creation of a wireless trading community—users could trade information across a room or across a state.

The use of embedded codes, characters and information offers a unique opportunity for game content providers to create value-added entertainment in games, thereby enhancing the enjoyment of games by the players. Hidden collectibles also add a wireless dimension to trading and collecting. A game's life can be extended and repeat experiences avoided by adding new activities, characters and levels into games. The element of surprise, and communications with other players and the game content provider, helps players become involved in the gaming experience by maintaining a high level of enjoyment and challenge.

The use of embedded codes is also applicable to modem applications. However, the use of such codes with a pager-equipped portable game machine offers a spontaneous—across the room to across the nation—interactive gaming experience. A modem hook-up requires the portable game machine (an inherently portable device) be treated as a hard-wired product. The pager-equipped portable game machine described herein does not have such limitations. It can be used almost anywhere, keeping the game machine portable all the time.

Messages

The system also enables bi-directional transmission of messages with images and sound bytes to other pagers in the network using, for example, a digital camera cartridge in combination with a pager cartridge. The image and sound data may be compressed/decompressed in accordance with well-known compression/decompression techniques to more effectively utilize the available bandwidth.

Libraries of words, phrases, sound bytes and standard graphic elements (e.g., hearts, spades, a boat) supplemented by user-generated custom libraries of words, phrases and graphics add to the speed, ease and fun of messaging by introducing emotions and images into "conversations". FIG. 11A illustrates examples of conversations using pagers in accordance with the present invention. It can be seen that by using "coding", the length of the messages may be reduced. Since message charges are generally based on the number of characters in the message (by way of illustration, not by way of limitation, $0.0625 for 10 characters), the use of coding to reduce message length can reduce message charges. FIG. 11B illustrates sample chat codes. Again, it can seen that the use of some of these chat codes reduces the number of characters in a message, thereby reducing message charges.

The codes may be used to develop a "language" and to create a "grammar" for that language. The language and/or grammar may be unique to two users or two some small group of users and permits communication of messages that will only be understood by the users with knowledge of the language and grammar. One way of developing this language and/or grammar is using symbola as will be explained in greater detail below.

Figure 11C:
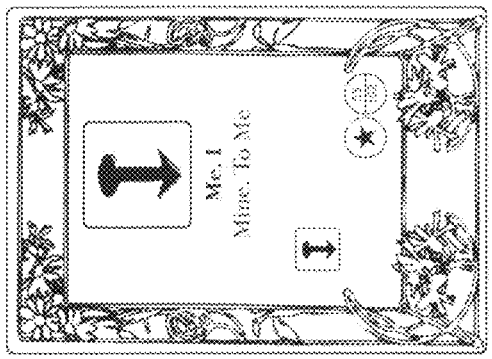
FIGS. 11C-11N illustrate cards used for symbola.
Figure 11F:
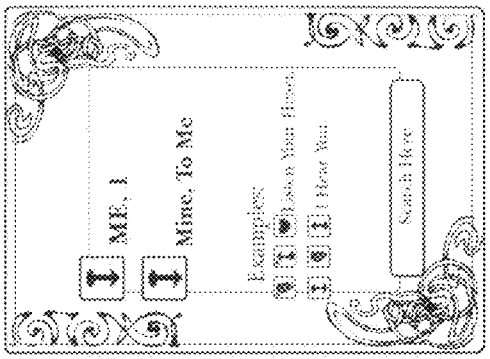
Figure 11D:
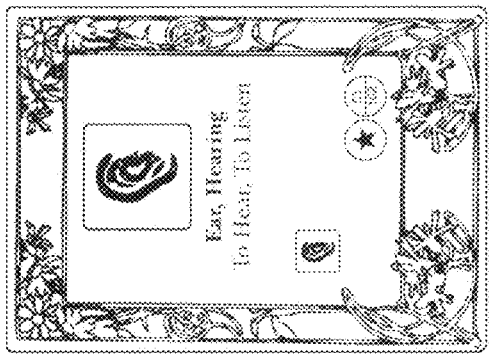
Figure 11G:
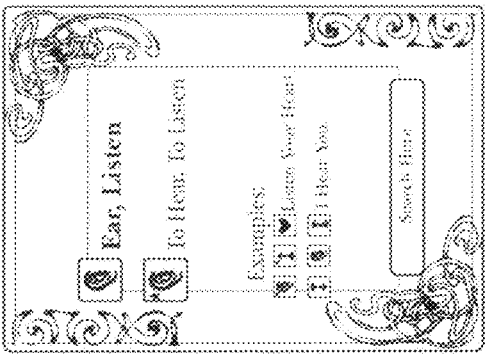
Figure 11E:
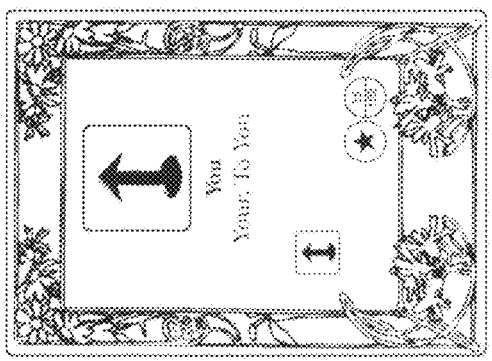

FIGS. 11C-11E show examples of symbola on cards that may be distributed or sold (e.g., at retail outlets) to those wishing to communicate using symbola. It is also possible to generate "on-line" cards that may be downloaded and printed out using a user's personal computer. To enhance collectability or desirability, the cards may be provided with themes (e.g., Western, Asian, Ancient Egypt, etc.) or other graphics. The card of FIG. 11C shows an upwardly directed arrow that means "You"; the card of FIG. 1D shows an ear that means "Ear or "Hearing"; and the card of FIG. 11E shows a downwardly directed arrow that means "Me" or "I". The cards can be viewed as constituting part of a symbola dictionary.

Figure 11H:
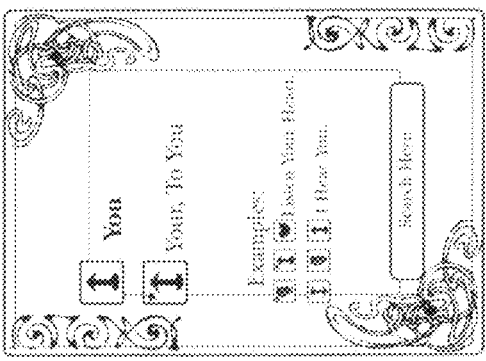

Certain symbols may be added to each of the symbola to change or vary its meaning. For example, these added symbols may make the symbola an adjective or may make the symbola indicative of a feeling, an action and the like. Examples of such added symbols are shown in FIGS. 11F-11H. With reference to FIG. 11F, positioning a star (*) at the upper left corner of the upwardly directed arrow changes the meaning of "You" to "Your" or "To You". With reference to FIG. 11G, positioning a star (*) at the upper left corner of the ear changes the meaning of "Ear" or "Listen" to "To Hear" or "To Listen". With reference to FIG. 11H, positioning a star (*) at the upper left corner of the downwardly directed arrow changes the meaning of "Me" or "I" to "Mine" or "To Me". Each of the cards shown in FIGS. 11F-11H provides examples of messages that include one or more of the symbols shown on the cards. For the example cards shown in FIGS. 11F-11H, the messages are "Listen Your Heart" and "I hear you". It will be apparent that other symbols may be positioned around the symbola to change or vary the meaning of the symbola. For example, a question mark (?) positioned at the upper right corner of the symbola may indicate "sounds like".

Figure 11J:
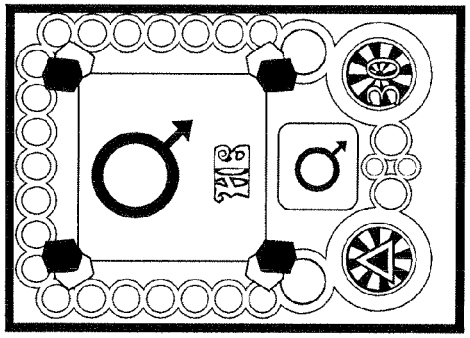
Figure 11M:
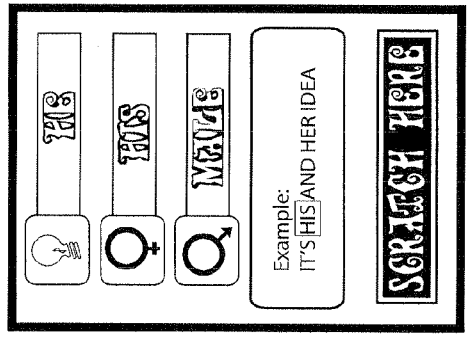
Figure 11K:
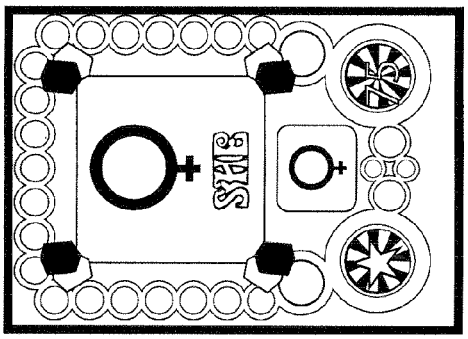
Figure 11N:
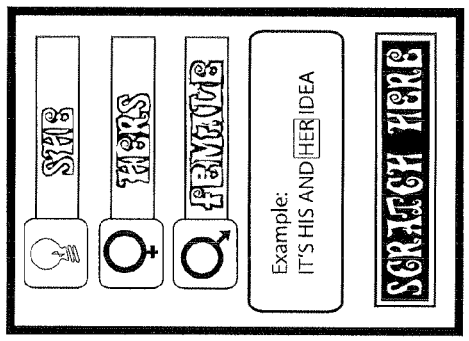
Figure 11I:
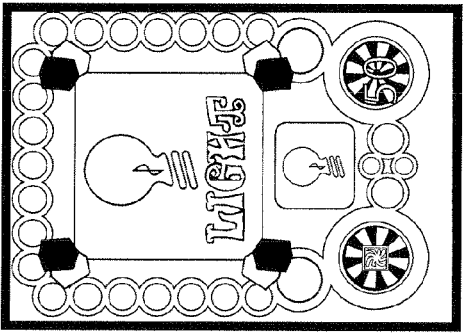
Figure 11L:
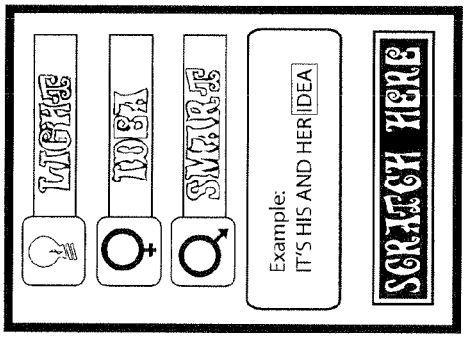

The meaning of a symbola may also be determined by its color. FIGS. 11I-11K show cards that illustrate symbola for the words "light", "she" and "he", respectively. FIGS. 11L-11N show cards that illustrate how the meaning of the symbola for "light", "she" and "he" can be changed by changing the color of the symbola. Thus, with reference to FIG. 11L, the symbola in the card of FIG. 11I means "light", "idea" or "smart" if the color of the symbola is yellow, light blue or red, respectively. With reference to FIG. 11M, the symbola in the card of FIG. 11J means "she", "hers" or "female" if the color of the symbola is pink, dark blue or red, respectively. With reference to FIG. 11N, the symbola in the card of FIG. 11K means "he", "his" or "male" if the color of the symbola is pink, gold or purple, respectively.

In the pager cartridge of FIG. 5B, the symbola may be stored in ROM 910. Some or all of the symbola may be available for use at all times. In certain cases, stored symbola must be activated by, for example, the entry of a particular activation code. This code may, for example, be provided on the scratch-away portions of the cards shown in FIGS. 11F-11H and FIGS. 11L-11N. Entry of these codes may activate the symbola and/or may activate the symbols used to vary or change the meaning of the symbola. In other implementations, the entry of the activation code can initiate a pager message to the game content provider that requests transmission of particular symbola to be added to the already on-board symbola. The game content provider then transmits a message (or messages) that communicates the requested symbola to the pager cartridge and the symbola are stored in a read/write memory of the pager cartridge from where they are accessible by the user to compose messages.

Message Cards

Pager cartridge 100 may be pre-configured with a certain account balance (expressed either as a particular number of message units or a particular amount of money), thereby permitting a player to use pager cartridge 100 immediately after purchase. An activation routine via one or more messages communicated between the system operator and the player's pager cartridge may be implemented so that the pager cartridge's unique hardware identification is logged into the system. Upon a successful execution of the activation routine, pager cartridge 100 operates immediately without any paperwork, advance payments or commitments on the part of the player.

As players send messages, the message meter (message credits) is automatically decremented. The amount that the meter is decremented is generally based on the length of the messages that are sent. When the pager cartridge message meter approaches empty, players are alerted (e.g., by a visual message) that their message meter must be refreshed.

Figure 12A:
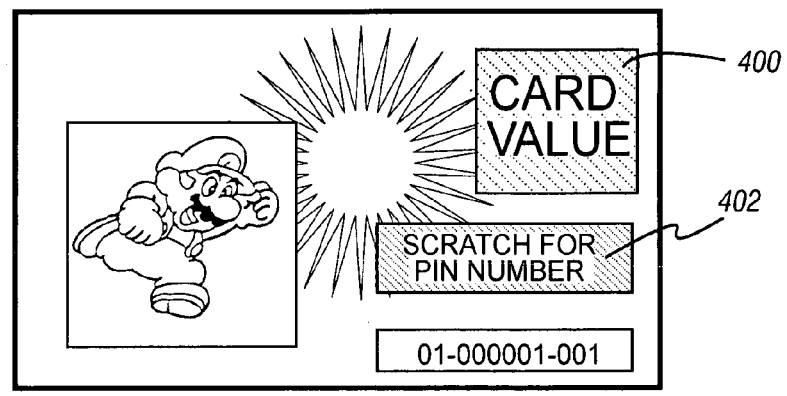
FIGS. 12A and 12B show message cards usable with pager cartridge 100.
Figure 12B:
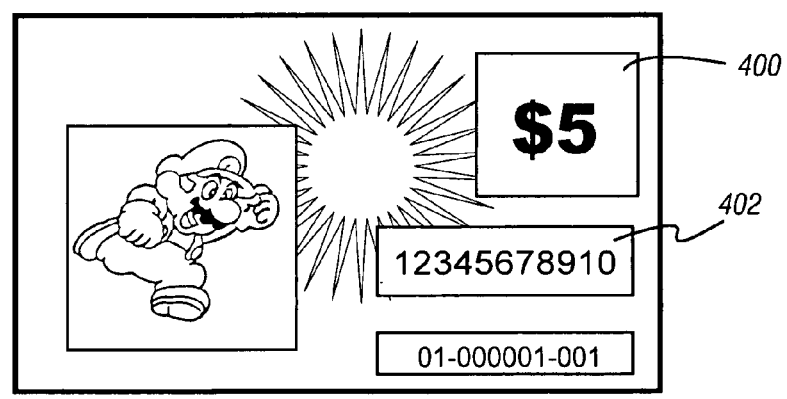

In one implementation, a player may refresh or add to the account balance by purchasing message cards such as a message card 400 shown in FIGS. 12A and 12B. The message card may be sold at retail outlets and has a particular card value (e.g., $5.00). The player scratches away portion 402 of message card 400 to expose a uniquely encrypted number. Generally speaking, while the particular application of cards having scratch-away portions that reveal numbers, graphics, etc. for providing message units for a pager cartridge is believed to be novel, cards having scratch-away portions are known and available from, for example, Scientific Games. The player then enters the number or other code into pager cartridge 100 (e.g., via a virtual numeric keypad displayed on display 16 of game machine 10). This number or other code (or some data derived from this number) is then sent as part of a message to the system operator. The system operator logs the particular card as used so that it may be voided in the master inventory of cards. If an appropriate acknowledgment is received by pager cartridge 100 from the system operator in response to this message, the account balance within pager cartridge 100 is then set to a level equal based on the card value, plus any existing account balance. As mentioned above, the system operator does not necessarily generate the content communicated using the pager system and thus may not be the seller of the message cards. Thus, for example, the seller of the message cards may make an arrangement with the system operator to provide the various services described herein. In this case, it is possible that the master inventory of message cards may be maintained by the card seller and, in this case, provision would be made for communication between the system operator and the card seller in order to log particular cards as used.

In still another implementation, a reader or scanner for reading credit card information or information on a message card (e.g., a magnetic strip or bar codes) may be used to increment an account balance.

The message cards may be designed as collectibles by providing them with certain graphics or other indicia.

Of course, other methods of incrementing the account balance of pager cartridge 100 may be implemented. For example, a player (or the player's parent, guardian or relative) might provide the system operator with credit card information (via telephone, facsimile, e-mail or regular mail, for example) and the system operator may generate a message including account balance "credit" data for incrementing the account balance. In some implementations, the player (or the player's parent, guardian or relative) might have a contract with the system operator that provides for a certain amount of credit to be periodically added to the account balance (e.g., monthly) via messages sent from the system operator. In other implementations, players may receive "frequent message units" as an award for reaching certain predetermined message unit levels or even for achieving certain levels in game play. Frequent message units may also be provided in connection with other purchases much like frequent flier miles are awarded for using credit cards. Thus, for example, a player who stays at a particular hotel for a certain number of nights may be awarded a certain number of message units that are usable for incrementing the player's account balance. Of course, even in these arrangements, message cards may be used to supplement the account balance and it would still be possible for a player to use pager cartridge 100 without entering into a contract with the system operator or signing up for a frequent message unit program.

Still another technique for incrementing a player's account balance involves the purchase of a message card that has a two-part number or code. The card retailer communicates the first part of the number or code to the system operator via, for example, the Internet, a direct phone connection, etc. The user subsequently enters the second part of the number or code into pager cartridge 100 by, for example, a virtual keypad displayed on display 16 of game machine 10 and the appropriate manipulation of operating keys 48a-48e. This number or code (or some data derived from the this number or code)

is communicated to the system operator as part of a message from pager cartridge 100. If an appropriate acknowledgment is received by pager cartridge 100 from the system operator in response to this message, the account balance within pager cartridge 100 is then set to a level equal based on the card value, plus any existing account balance. The two-part code or number reduces the number of digits or characters that must be entered by the user of the pager cartridge and therefore simplifies the user operations involved with incrementing the number of message credits stored in the memory of pager cartridge 100. In this particular technique, the first part of the number or code may be encoded as a bar code printed on the message card or may be encoded onto a magnetic stripe formed on the message card. The second part of the number or code may be revealed by scratching away a scratch-away portion of the message card. In this way, the message card retailer can user a bar code reader or a magnetic stripe reader to obtain the first part of the number or code, thereby simplifying the retail process.

Pager cartridge 100 is also configured to receive messages that turn off (disable) the cartridge and/or prohibit or limit access to certain features such as PagerWorld. Such messages may be sent, for example, to problem users.

Pager cartridge 100 can be an integral component of interactive games that rely on hand-held game machines and/or game consoles connected to televisions. For example, a message (e.g., a game move or instruction) can be received by pager cartridge 100 connected to game machine 10. The move or instruction contained in the message can be utilized by a game program executed by game machine 10 or can be transmitted via a serial or infrared link to another portable game machine and/or to a game console connected to a television. This capability maximizes mobility as well as the economies of game-playing. Thus, players who have a portable game machine configured with a pager cartridge can share information with those players who do not have such a configuration.

The following provides a functional description summary of the above and other functions:

A. Messaging (alphanumeric, graphic, custom, standard, sound, broadcast)
Two-way or one-way
1. Broadcasts to all pagers
2. Carbon copy messages (group messages)
3. Download simple games and game levels
4. Digital camera picture transmission (with/without sound)
5. Messages plus sound bites
6. Erase all messages or selective messages
7. Protect messages (selective or all)
8. Oversize message alert (sender)
9. Message time stamping (paging service provider)
10. Last address redial
11. Save messages when pager powered off
12. Send messages to numeric and/or alpha pagers
13. Auto correction of garbled messages
14. Overhead messages
   meter renewal request
   meter renewal acknowledgment
   pager first time activation and confirmation
   ability to change pager address remotely via paging service
   issue credits for non-completed messages via paging service
15. Messages to and from Internet, telephones and pagers
16. Introduction of location finder service under E-911 conditions
17. Global Positioning System mapping B. Dictionaries, Directories and Libraries
1. Standard words and phrases (e.g., fifty entries)
2. Custom words and phrases (e.g., twenty entries)
3. Standard graphics and symbols (e.g., twenty-five entries)
4. Custom graphics and symbols (e.g., ten entries)
5. Custom address book (e.g., ten entries+portable memory cartridge)
6. Standard audio library with sounds, word/phrases (male and female versions/voices) (e.g., fifteen entries)
7. Built-in instructions and player help information
8. Pager frequently asked questions
9. Multiple musical options for message received alert audio C. Features
1. On screen keyboard
2. User password (PIN) device access protection
3. Message storage (e.g., 24 hours+, paging service provider)
4. Scheduled message release (paging service provider, if no internal clock)
5. Memory full indicator
6. Scrolling indicator and scrolling of messages
7. Message time-stamping and return address
8. Reminder alerts
9. Portable message/game storage (portable memory cartridge)
10. Accessible and updateable message meter
11. Accessible signal strength meter or indicator
12. Pager general capcode identification (paging company)
13. Pager device specific capcode extension (paging company)
14. Power on switch
15. Silent vibrator mode
16. Audio mode (from musical alter options library)
17. Belt clip
18. Signal kill button
19. Low battery beep (30 minute intervals)
20. Internal real time clock
21. Memory: read only and read/write
22. Game machine compatibility
23. Connectivity to other portable game machines and/or game consoles through hardwire or infrared connection
24. Connectivity to personal computer through hardwire or infrared connection D. Message cards
1. Manufactured to state lottery security standards
2. Individual serialization
3. Non-sequential encrypted message meter activation codes
4. Dynamic database message card tracking system
5. Unique activation message cards to start meter and register device on system
6. Artful designs to create user collectible message cards
7. Management of an optional monthly subscription program Further features include:
"Messages" are easily constructed from a dictionary of words
Phrases can be augmented and created by users to reflect their personal communication styles, i.e., users will likely develop their own codes when messaging among friends
Messages are composed by "pointing and clicking" using an on-screen keyboard or electronic dictionaries. Users have the ability to create their own address books to quickly transmit to friends and family Digital images can be exchanged and optionally supplemented by sound bites from a sound dictionary A belt hook accessory to easy transport Pager device may be bundled with introductory message card permits immediate use of pager at time of purchase activation logs in the pager devices' unique hardware identification (capcode) to the paging system pager operates immediately without any paperwork, advance payments or commitments Design message cards to be collectible (e.g., Pokemon characters)

Message cards are uniquely encrypted and serialized to insure positive inventory control, preventing multi-use and counterfeiting Exact card status is maintained by validating all cards entered by users into their pagers (may be accomplished by accepting card validation messages into a database before authorizing individual pager message meter increments).

Example Piggy-Backed Cartridges

As described above, physically, pager cartridge 100 is a stand-alone accessory device, powered by its own power source (e.g., batteries), which can receive messages even when it is not attached to game machine 10. Notification circuitry 134 of pager cartridge 100 notifies the user that a message has been received, thereby prompting the user to attach pager cartridge 100 to game machine 10 via the corresponding connectors in order to view the received messages. When pager cartridge 100 is inserted into the game cartridge slot of game machine 10 for connection thereto, game machine 10 automatically activates a display of messages on the display thereof in accordance with the operating software stored in the memory of the pager. As noted above (see FIGS. 6C and 6D), pager cartridge 100 itself includes a built-in cartridge slot to accept game cartridges or other accessories (such as read/write memory cartridges, a digital camera, etc.), thereby enabling game play or digital camera operations while pager cartridge 100 is attached to game machine 10. The use of blank read/write memory cartridges can be used to augment internal memory for storing large messages (e.g., images) and to accept and store mini-games, game levels, messages, game hints, tips, high scores, etc. for later viewing or use. These read/write memory cartridges also permit the sharing of games and game information among game players.

Example GPS Cartridge

As mentioned above, a global positioning system (GPS) cartridge is also selectively insertable into the slot of game machine 10 or into the slot of pager cartridge 100. GPS is a satellite-based radio navigation system developed and operated by the U.S. Department of Defense (DOD) and permits users to determine their three-dimensional position, velocity, and time. GPS utilizes satellites that are arranged in orbits such that at any time a minimum of six satellites will be in view to users anywhere in the world. The satellites continuously broadcast position and time data. The GPS cartridge includes, among other things, an antenna, a receiver, a demodulator, and a control circuit that allows the user to receive the GPS satellite broadcasts and compute his/her precise position, velocity and time based on measurements of the user's distance from the group of satellites in space. More specifically, each GPS satellite transmits an accurate position and time signal. The circuitry of the GPS cartridge measures the time delay for the signal to reach the receiver, which is the direct measure of the apparent range to the satellite. Measurements collected simultaneously from four satellites are processed to solve for the three dimensions of position, velocity and time.

Figure 13:
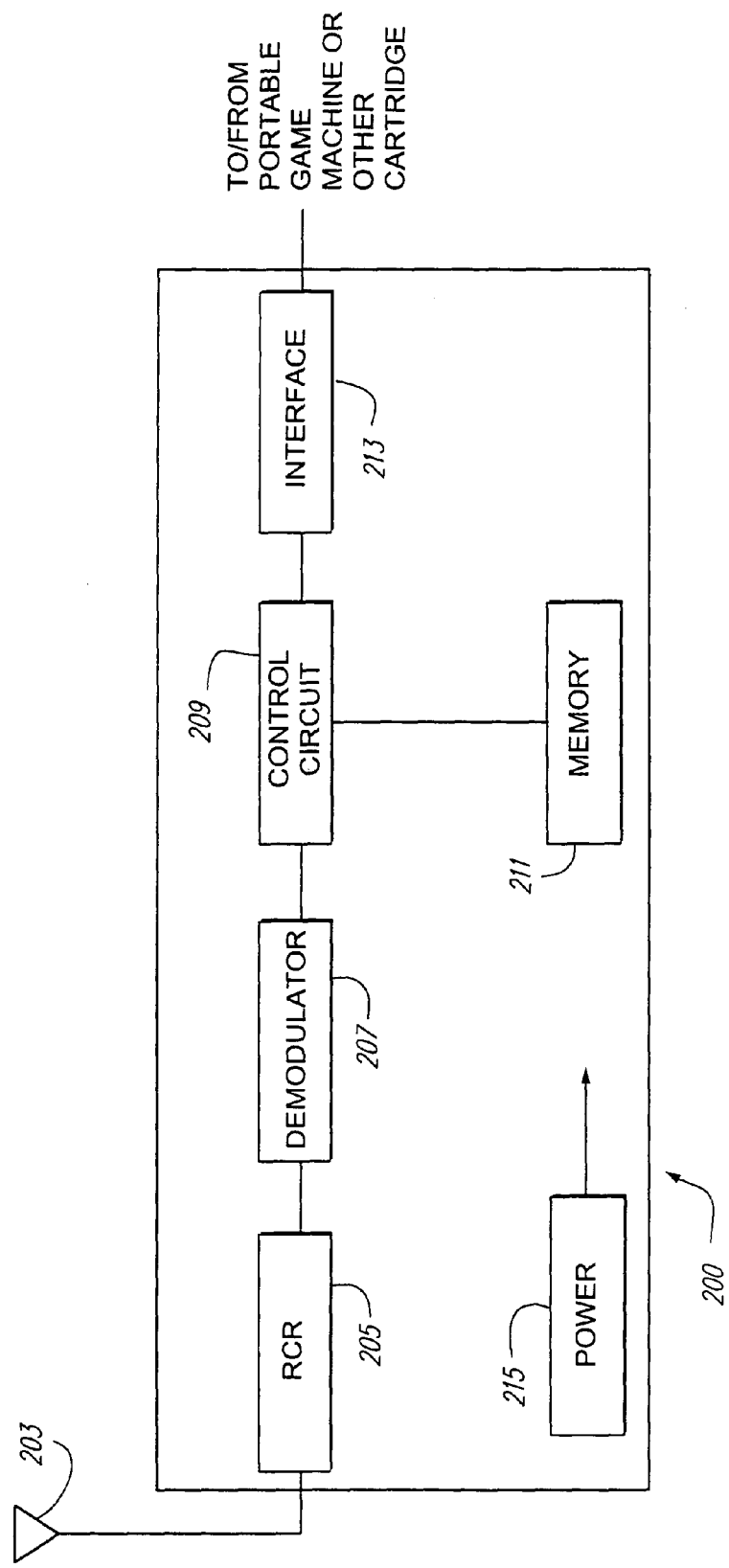
FIG. 13 is a block diagram of a GPS cartridge 200.

FIG. 13 is a block diagram showing the components mounted on a printed circuit board contained within a plastic housing of a GPS cartridge 200. These components include a receiving antenna 203, a GPS receiver 205, a GPS demodulator 207, a GPS control circuit 209, a memory 211, and an interface 213. The radio waves transmitted from GPS satellites are received by GPS receiver 205 through antenna 203, and information carried by the radio waves, namely, time and satellite position is demodulated by GPS demodulator 207 and supplied to GPS control circuit 209. GPS control circuit 209 generates user position information (longitude, latitude and altitude) on the basis of the received information. Memory 211 contains the control program usable by control circuit 209 for calculating the user position information based on the received information. Memory 211 is also usable by control circuit 209 for storing data during the position calculations and during other operations performed by control circuit 209. Memory 211 will generally comprise a read only memory portion and a read/write memory portion. Memory 211 may also store one or more video game programs that are executable by CPU 26 of game machine 10. Game machine 10 may execute video game programs (including those stored in memory 211) in accordance with position information calculated by GPS control circuit 209.

Interface 213 provides for communication between the GPS cartridge 200 and portable game machine 10. Example GPS cartridge 200 includes electrical contacts provided on the edge of the printed circuit board contained within the plastic housing of GPS cartridge 200. These electrical contacts mate with the corresponding edge connector electrical contacts within game machine 10 when GPS cartridge 200 is inserted into the slot of game machine 10 and with the corresponding edge connector electrical contacts within pager cartridge 100 when GPS cartridge 200 is inserted into the slot of pager cartridge 100. In this way, GPS cartridge 200 may be electrically connected with game machine 10 and/or pager cartridge 100 whereby, for example, user position information may be communicated to game machine 10 and/or pager cartridge 100. GPS cartridge 200 may optionally be provided with a display and/or speaker (not shown) for communicating the position information to the user. A power supply 215 such as replaceable batteries supplies power to the components of GPS cartridge 200.

GPS cartridge 200 may itself be provided with a slot into which other cartridges such as game cartridges, pager cartridges, read/write memory cartridges, etc. are insertable. The slot contains edge connector electrical contacts that are configured to mate with electrical contacts of the game cartridges, pager cartridges, read/write memory cartridges, etc. Thus, it will be appreciated that other cartridges may be "piggy-backed" onto GPS cartridge 200.

Example Digital Camera Cartridge

A digital camera cartridge is also selectively insertable into the slot of game machine 10 or into the slot of another cartridge such as pager cartridge 100. The digital camera cartridge is usable to capture images, which images may then be transmitted to others via an operation using paging cartridge 100. By way of example, but not limitation, one digital camera cartridge suitable for use in connection with the present invention is described in application Ser. No. 09/430,169, filed on Oct. 29, 1999, now U.S. Pat. No. 6,435,969, the contents of which are incorporated herein in their entirety. The digital camera cartridge of application Ser. No. 09/430, 169 will be referenced herein as digital camera cartridge 300 and will now described with reference to FIGS. 14-17.

Figure 14:
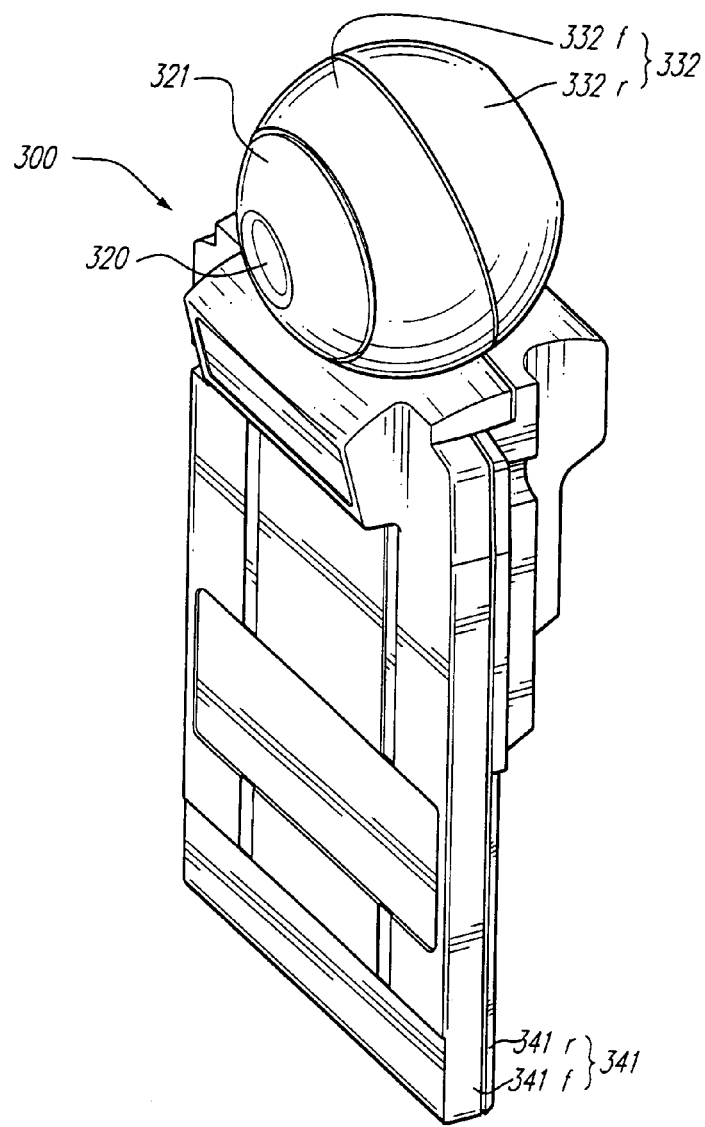
FIGS. 14 and 15 are external perspective views showing the structure of a digital camera cartridge 300.
Figure 15:
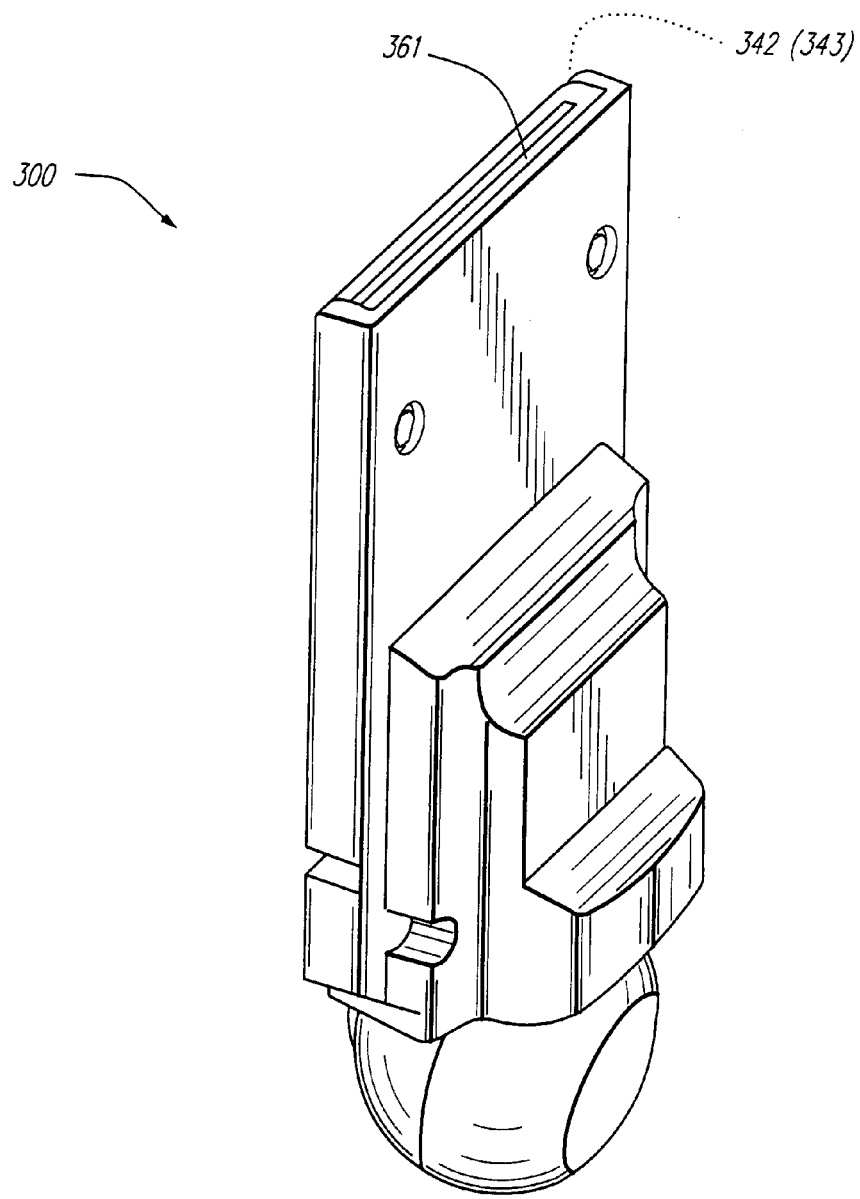
Figure 16:
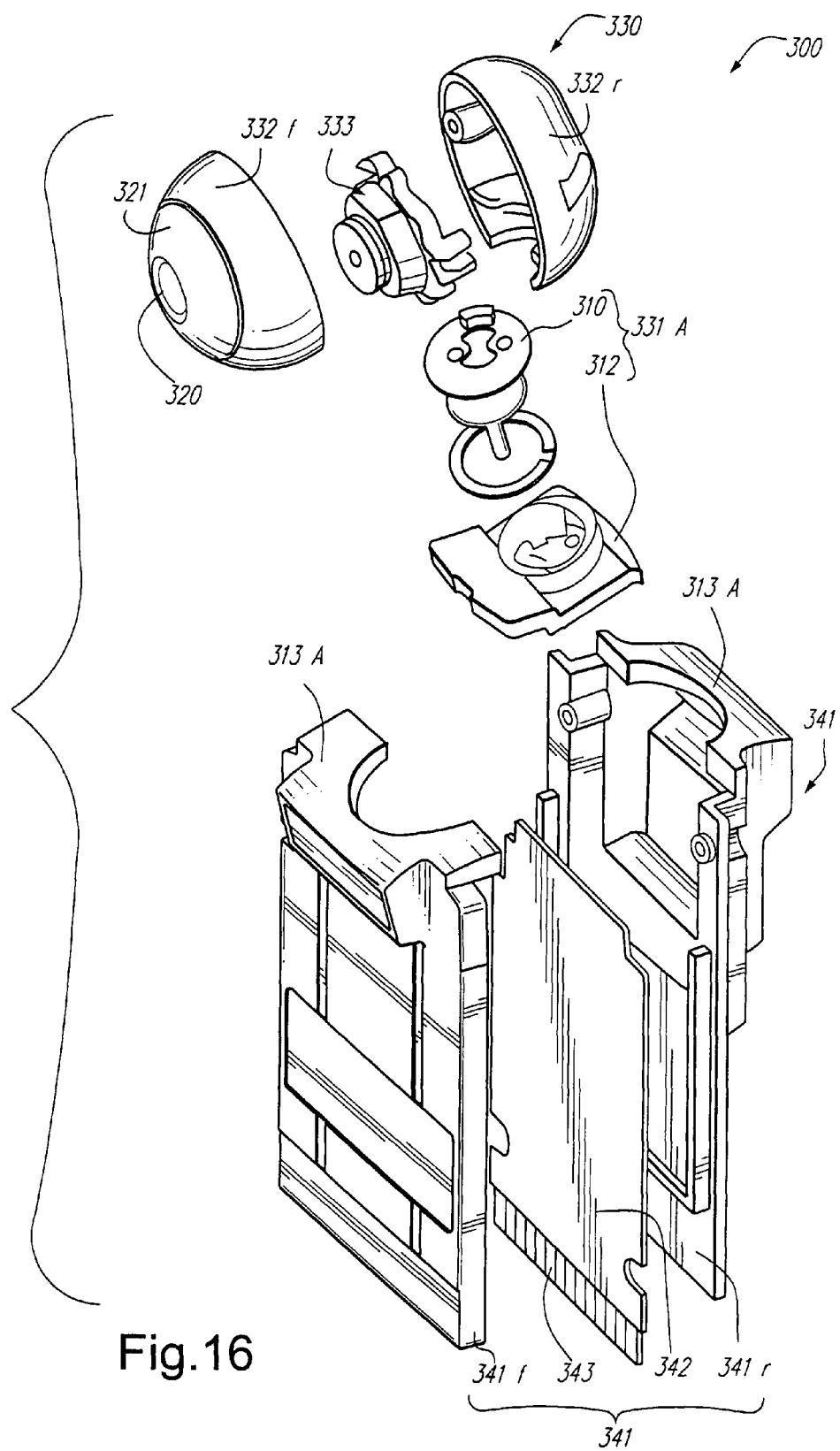
FIG. 16 is an exploded view showing the digital camera cartridge 300 of FIGS 14 and 15.

FIGS. 14 and 15 are external perspective views showing the structure of digital camera cartridge 300. FIG. 16 is an exploded view showing that digital camera cartridge 300 includes a camera portion 330, a camera supporting portion 331, and a cartridge body portion 341. Camera portion 330 is shown as including an image detecting device 333 that is encased by generally spherical case 332 having a front portion 332$f$ and a rear portion 332$r$. The front portion 332$f$ of spherical case 332 includes a front panel 321 in which an opening 320 is provided for allowing images to be incident on a lens (not shown) of image detecting device 333. Support portion 331 comprises a camera supporting body 310 and a fixed supporting body 312. Support portion 331 is configured to rotatably support camera portion 330 such that camera portion 330 is rotatable between a "forward-looking" direction (i.e., the direction of the outward normal from the outer surface of a front portion 341$f$ of cartridge body portion 341) and a "rearward-looking" direction (i.e., the direction of the outward normal from the outer surface of a rear portion 341$r$ of cartridge body portion 341). Support portion 331 further supports camera portion 330 so that the angle between the optical axis and the outward normal from the outer surface of front portion 341$f$A of cartridge body portion 341 when the camera portion is positioned in the forward-looking direction is between about 10 to 45° and is preferably about 15°. In this way, for example, camera portion 330 is conveniently oriented to detect and capture the face of a user watching display 16 of game machine 10.

As most clearly seen in FIG. 15, an opening 361 is formed at the lower portion of digital camera cartridge 300. Digital camera cartridge 300 houses a printed circuit board 342 on which is mounted a nonvolatile semiconductor read-only memory (e.g., ROM, EPROM, etc.) and a read/write memory (e.g., RAM or other temporary memory). A plurality of terminals 343 is arranged on the lower portion of printed circuit board 342 to electrically connect components mounted on the board to connector 40 of game machine 10 or to the connector of another cartridge into which digital camera cartridge 300 is inserted. Terminals 343 are connected to the electrical components mounted on printed circuit board 342 in a suitable circuit pattern.

Digital camera cartridge 300 can be used to capture images of other persons and objects, and these images are displayed on display 16. By providing a predetermined input to game machine 10 via some combination of one or more of operating keys 48$a$-48$e$, the image displayed on display 16 may be stored in the read/write memory of digital camera cartridge 300. If digital camera cartridge 300 is piggy-backed into a pager cartridge 100, the images stored in the read/write memory of digital camera cartridge 300 may be transmitted to others using the radio circuitry of pager cartridge 100 in response to some other predetermined input to game machine 10 via some other combination of one or more of operating keys 48$a$-48$e$.

Figure 17:
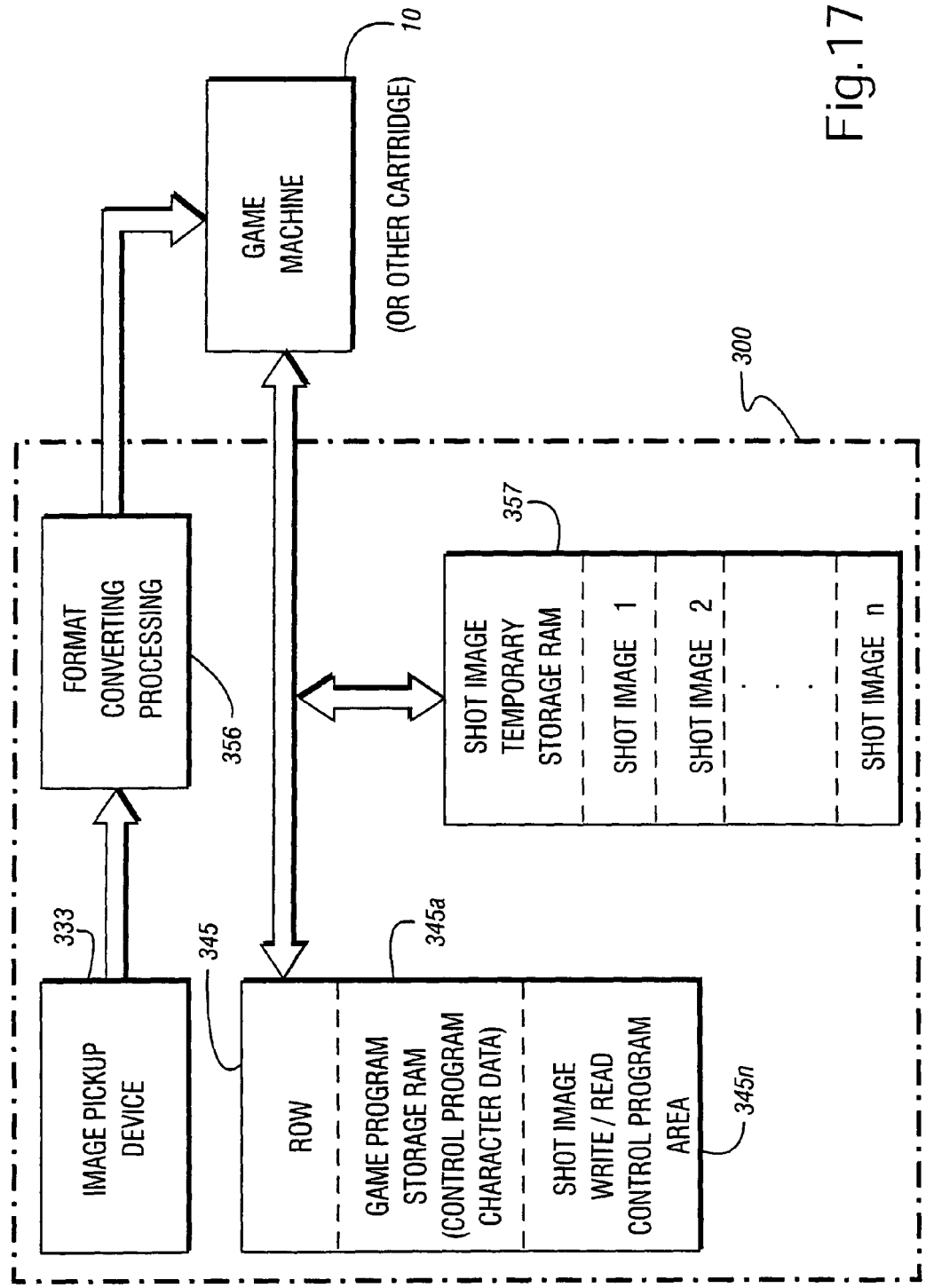
FIG. 17 is a block diagram of a digital camera cartridge 300.

FIG. 17 is a block diagram showing that the electrical structure of digital camera cartridge 300 includes camera portion (image detecting device) 333, a ROM 345, a format converting processing circuit 356, and a shot image temporary storage RAM (hereinafter referred to as "image RAM") 357 for storing captured images. ROM 345 includes a game program storage area 345$a$ similar to the ROM used in game cartridge 12, and a shot image write/read control program storage area 345$b$. Game program storage area 345$a$ stores one or more video game programs and shot image write/read control program storage area 345$b$ stores an image write program that is usable by format converting processing circuit 356 to format convert image data captured by camera portion 330 and then to write the format-converted image data to image RAM 357. Program storage area 345$b$ also stores an image read program usable to read image data stored in image RAM 57. ROM 345 may also store image compression/decompression routines that utilize any conventional compression/decompression algorithms.

Like the above-described pager cartridge 100 and GPS cartridge 200, digital camera cartridge 300 may itself be provided with a slot into which other cartridges such as game cartridges, read/write memory cartridges, etc. are insertable. The slot contains edge connector electrical contacts that are configured to mate with electrical contacts of the game cartridges, read/write memory cartridges, etc. Thus, it will be appreciated that other cartridges may be "piggybacked" onto digital camera cartridge 300.

Example Read/Write Memory Cartridge

Figure 18:
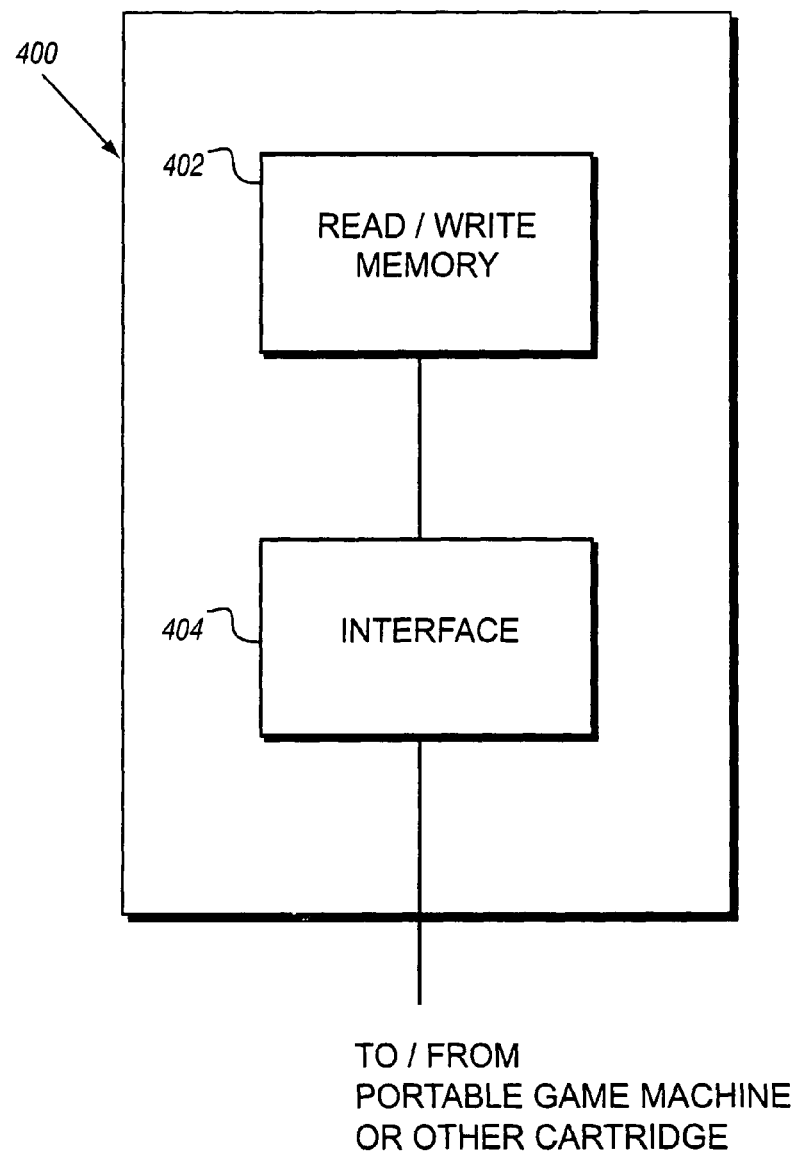
FIG. 18 is a block diagram of a read/write memory cartridge 400

A read/write memory cartridge 400 is also insertable into the slot of game machine 10 or into the slot of another cartridge such as pager cartridge 100, GPS cartridge 200, or digital camera cartridge 300. FIG. 18 is a block diagram of a read/write memory cartridge 400 that includes a read/write memory 402 and an interface 404 for electrically connecting the read/write memory cartridge to game machine 10 (or other cartridge). Read/write memory 402 is usable for storing various types of data including game score data, image data captured by a digital camera cartridge 300, message data received by a pager cartridge 100. In the case of image data and message data, one or more read/write memory cartridges may be used to "archive" images or messages by, for example, piggy-backing the read/write memory cartridge onto a digital camera cartridge 300 or a pager cartridge 200 and then transferring images and messages thereto in response to predetermined user inputs to operating keys 48$a$-48$e$ of game machine 10.

The present invention may also be applied to other wireless technologies such as GSM (Global System for Mobile Communications) and WAP (Wireless Application Protocol). Many of the features of the invention (e.g., intervention, embedded game codes and tactics) are applicable to wired connections (e.g., via modem). Of course, in the case of a portable game machine, a wired connection limits mobility—an inherent advantage of a portable game machine. Nonetheless, the benefits derived from intervention, embedded game codes and tactics, etc. in terms of increased enjoyment of game playing can outweigh the mobility limitations.

Although the above description is in terms of a portable game machine, it will be apparent that the principles of the present invention may be adapted to other types of game machines including game consoles such as the N-64 available from Nintendo of America or as described in application Ser. No. 09/643,981, filed Aug. 23, 2000.

In addition, while the pager cartridge, GPS cartridge, and digital camera cartridge are shown as add-on devices to an existing game machine, it is possible to incorporate some or all of the circuitry needed to implement the above-described operations in the game machine itself (portable or otherwise).

Other Example Compatible Implementations

Certain of the above-described system components could be implemented as other than the portable game machine 10 described above. For example, one could run graphics application or other software written for the system on a platform with a different configuration that emulates the system or is otherwise compatible with it. If the other platform can successfully emulate, simulate and/or provide some or all of the hardware and software resources of portable game machine 10, then the other platform will be able to successfully execute the software.

As one example, an emulator may provide a hardware and/or software configuration (platform) that is different from the hardware and/or software configuration (platform) of the system. The emulator system might include software and/or hardware components that emulate or simulate some or all of hardware and/or software components of the system for which the application software was written. For example, the emulator system could comprise a general-purpose digital computer such as a personal computer, which executes a software emulator program that simulates the hardware and/or firmware of the system. The emulator could also comprise a personal digital assistant (PDA) that simulates the hardware and/or firmware of the system. An emulator may execute the game software so that a particular game functions and/or appears somewhat differently from how it functions and/or appears on its intended platform. Thus, the emulator may show a color game in monochrome or a play a game without its accompanying sound. Emulation as used herein is intended to include emulation that results in these and other such differences in functions and/or appearance.

Some general purpose digital computers (e.g., IBM or MacIntosh personal computers and compatibles) are now equipped with 3D graphics cards that provide 3D graphics pipelines compliant with DirectX or other standard 3D graphics command APIs. They may also be equipped with stereophonic sound cards that provide high quality stereophonic sound based on a standard set of sound commands. Such multimedia-hardware-equipped personal computers running emulator software may have sufficient performance to approximate the graphics and sound performance of the system. Emulator software controls the hardware resources on the personal computer platform to simulate the processing, graphics, sound, peripheral and other capabilities of the portable game machine platform for which the game programmer wrote the game software. Similarly, PDAs running emulator software may have sufficient performance to approximate the graphics and sound performance of the system.

Figure 19A:
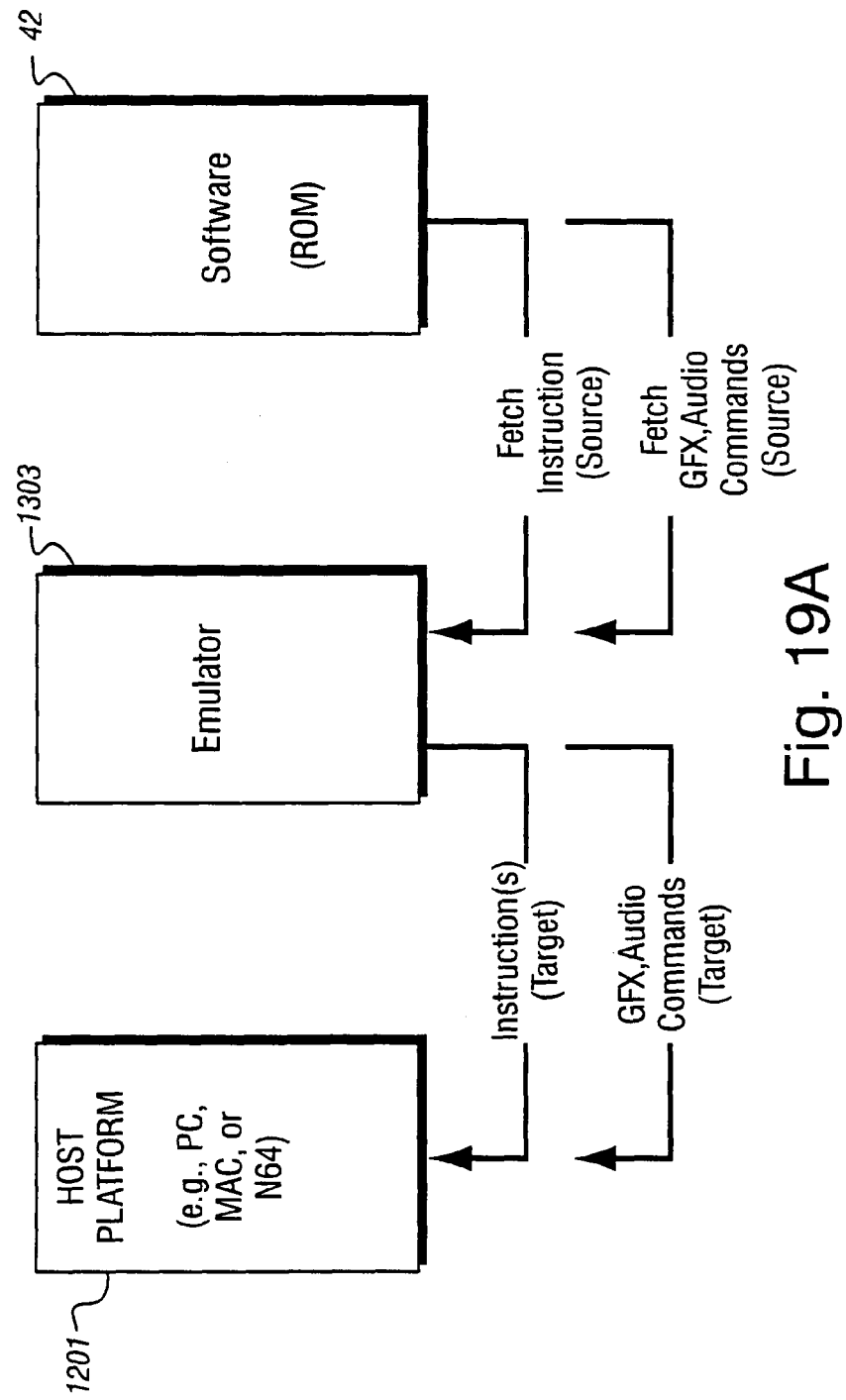

FIG. 19A illustrates an example overall emulation process using a host platform 1201, an emulator component 1303, and a game software executable binary image provided on a storage medium 42. Host 1201 may be a general or special purpose digital computing device such as, for example, a personal computer, a laptop computer, a palm-top computer, a video game console, a portable game machine, a personal digital assistant, an internet appliance, a set-top box, or any other platform with sufficient computing power. Emulator 1303 may be software and/or hardware that runs on host platform 1201, and provides a real-time conversion of commands, data and other information from storage medium 42 into a form that can be processed by host 1201. For example, emulator 1303 fetches "source" binary-image program instructions intended for execution by portable game machine 10 from storage medium 42 and converts these program instructions to a target format that can be executed or otherwise processed by host 1201.

As one example, in the case where the software is written for execution on a platform using an IBM PowerPC or other specific processor and the host 1201 is a personal computer using a different (e.g., Intel) processor, emulator 1203 fetches one or a sequence of binary-image program instructions from storage medium 1305 and converts these program instructions to one or more equivalent Intel binary-image program instructions. The emulator 1203 also fetches and/or generates graphics commands and audio commands intended for processing by the graphics and audio processor 114, and converts these commands into a format or formats that can be processed by hardware and/or software graphics and audio processing resources available on host 1201. As one example, emulator 1303 may convert these commands into commands that can be processed by specific graphics and/or or sound hardware of the host 1201 (e.g., using standard DirectX, OpenGL and/or sound APIs).

An emulator 1303 used to provide some or all of the features of the video game system described above may also be provided with a graphic user interface (GUI) that simplifies or automates the selection of various options and screen modes for games run using the emulator. In one example, such an emulator 1303 may further include enhanced functionality as compared with the host platform for which the software was originally intended.

FIG. 19B illustrates one example emulation host system 1201 suitable for use with emulator 1303. System 1201 includes a processing unit 1203 and a system memory 1205. A system bus 1207 couples various system components including system memory 1205 to processing unit 1203. System bus 1207 may be any of several types of bus structures including a memory bus or memory controller, a peripheral bus, and a local bus using any of a variety of bus architectures. System memory 1207 includes read only memory (ROM) 1252 and random access memory (RAM) 1254. A basic input/output system (BIOS) 1256, containing the basic routines that help to transfer information between elements within personal computer system 1201, such as during start-up, is stored in the ROM 1252. System 1201 further includes various drives and associated computer-readable media. A hard disk drive 1209 reads from and writes to a (typically fixed) magnetic hard disk 1211. An additional (possible optional) magnetic disk drive 1213 reads from and writes to a removable "floppy" or other magnetic disk 1215. An optical disk drive 1217 reads from and, in some configurations, writes to a removable optical disk 1219 such as a CD ROM or other optical media. Hard disk drive 1209 and optical disk drive 1217 are connected to system bus 1207 by a hard disk drive interface 1221 and an optical drive interface 1225, respectively. The drives and their associated computer-readable media provide nonvolatile storage of computer-readable instructions, data structures, program modules, game programs and other data for personal computer system 1201. In other configurations, other types of computer-readable media that can store data that is accessible by a computer (e.g., Magnetic cassettes, flash memory cards, digital video disks, Bernoulli cartridges, random access memories (RAMs), read only memories (ROMs) and the like) may also be used.

A number of program modules including emulator 1303 may be stored on the hard disk 1211, removable magnetic disk 1215, optical disk 1219 and/or the ROM 1252 and/or the RAM 1254 of system memory 1205. Such program modules may include an operating system providing graphics and sound APIs, one or more application programs, other program modules, program data and game data. A user may enter commands and information into personal computer system 1201 through input devices such as a keyboard 1227, pointing device 1229, microphones, joysticks, game controllers, satellite dishes, scanners, or the like. These and other input devices can be connected to processing unit 1203 through a serial port interface 1231 that is coupled to system bus 1207, but may be connected by other interfaces, such as a parallel port, game port Fire wire bus or a universal serial bus (USB).

A monitor 1233 or other type of display device is also connected to system bus 1207 via an interface, such as a video adapter 1235.

System 1201 may also include a modem 1154 or other network interface means for establishing communications over a network 1152 such as the Internet. Modem 1154, which may be internal or external, is connected to system bus 123 via serial port interface 1231. A network interface 1156 may also be provided for allowing system 1201 to communicate with a remote computing device 1150 (e.g., another system 1201) via a local area network 1158 (or such communication may be via wide area network 1152 or other communications path such as dial-up or other communications means). System 1201 will typically include other peripheral output devices, such as printers and other standard peripheral devices.

In one example, video adapter 1235 may include a 3D graphics pipeline chip set providing fast 3D graphics rendering in response to 3D graphics commands issued based on a standard 3D graphics application programmer interface such as Microsoft's DirectX 7.0 or other version. A set of stereo loudspeakers 1237 is also connected to system bus 1207 via a sound generating interface such as a conventional "sound card" providing hardware and embedded software support for generating high quality stereophonic sound based on sound commands provided by bus 1207. These hardware capabilities allow system 1201 to provide sufficient graphics and sound speed performance to play software stored in storage medium 62.

An emulator 1303 used to provide some or all of the features of the video game system described above may also be provided with a graphic user interface (GUI) that simplifies or automates the selection of various options and screen modes for games run using the emulator. In one example, such an emulator 1303 may further include enhanced functionality as compared with the host platform for which the software was originally intended.

Figure 19C:
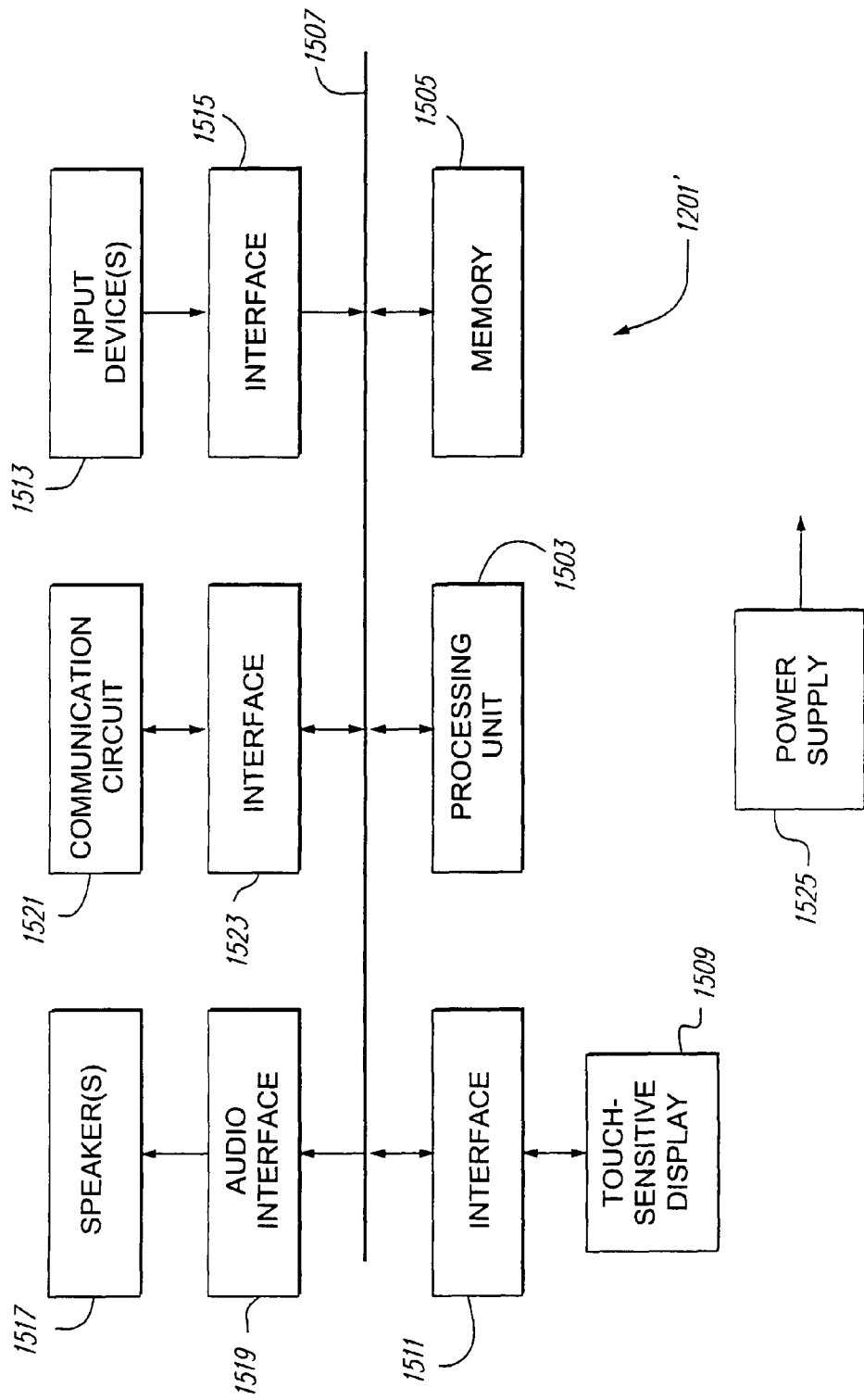

FIG. 19C illustrates another example emulation host system 1201' suitable for use with emulator 1303. The emulation host system in FIG. 19C is generally configured along the lines of a personal digital assistant such as those available from Palm Inc., Handpsring, Inc. and Sony and running an operating system such as Windows CE, EPOC or PalmOS. Typically, such personal digital assistants provide capabilities for a diary/scheduler, to-do lists, phone/address books and the like. System 1201' includes a processing unit 1503 and memory 1505. A system bus 1507 couples various system components including memory 1505 to processing unit 1503. Memory 1505 includes read only memory (ROM) and random access memory (RAM). A basic input/output system (BIOS), containing the basic routines that help to transfer information between elements within system 1201', such as during start-up, is stored in the ROM. Memory 1505 may also include external memory in the form of memory cards or memory sticks inserted into a suitable port provided in the housing for the components of system 1201'. A touch-sensitive display screen (e.g., a touch-sensitive liquid crystal display screen) 1509 is also connected to system bus 1507 via an interface 1511. Inputs via touch-sensitive screen 1509 are typically made using a stylus. Other input devices 1513 such as pushbuttons, switches, pointing devices and the like are also connected to system bus 1507 via an interface 1515. The input devices may also include external keyboards or game control devices (e.g., joystick, game controller). The input devices may be used as game controls (e.g., starting the game, character movement, character action, etc.) when system 1201' is used with emulator 1303. Games may be written to memory 1505 using communication circuit 1521 which may take the form of a modem for downloading the game from the Internet, for example, or of a cradle (e.g., a USB cradle) for connecting system 1201' to a personal computer.

One or more speakers 1517 are connected to system bus 1507 via an audio interface 1519 to output sounds. A communication circuit 1521 is connected to system bus 1507 via a communications interface 1523 to permit communication with other devices. By way of illustration, communication circuit 1521 may, for example, be a modem and communications interface 1523 may be a serial port. Generally speaking, communication circuit 1521 may be configured for wired or wireless communication in accordance with any conventional communication protocol. A power supply 1525 provides power for the components of system 1201'.

Any patent documents mentioned above are hereby incorporated by reference into the present application.

Although the present invention has been described and illustrated in detail, this description is for illustrative purposes only and is not to be construed as limiting the present invention.

We claim:

1. A global positioning system (GPS) cartridge for use with a game machine having a processing system to execute a video game program and player controls operable by a player to generate video game control signals, the GPS cartridge comprising:

GPS circuitry configured to determine position based on signals received from GPS satellites; and a connector that, in use, physically connects the GPS cartridge to the game machine so that the GPS circuitry is in communication with the processing system, whereby the position determined by the GPS circuitry is usable by the processing system during execution of the video game program, wherein the connector is configured to allow selective detachment of the GPS cartridge from the game machine.

2. The GPS cartridge according to claim 1, further comprising:

a memory for storing a video game program executable by the processing system.

3. The GPS cartridge according to claim 1, wherein the game machine is a hand-held game machine.

4. The GPS cartridge according to claim 1, wherein the GPS cartridge is adapted to receive a replaceable video game program cartridge when the GPS cartridge is connected to the game machine.

5. The GPS cartridge according to claim 1, wherein the GPS cartridge is adapted to receive a read/write memory cartridge when the GPS cartridge is connected to the game machine.

6. A removable device for use with a video game apparatus including a processing system for executing a video game program and user control keys for a user to provide control signals to the processing system, the removable device comprising:

a receiver;

position determining circuitry for determining geographic position based on signals received by the receiver; and a connector for detachably electrically connecting the position determining circuitry to the processing system of the video game apparatus, wherein the processing system of the video game apparatus uses the geographic position determined by the position determining circuitry during the executing of the video game program.

7. The removable device according to claim 6, wherein the position determining circuitry comprises global positioning system (GPS) circuitry.

8. The removable device according to claim 6, further comprising:
memory storing a program executable by the processing system of the video game apparatus.

9. A game machine comprising:
global positioning system (GPS) circuitry configured to determine position based on signals received from GPS satellites;
a user interface enabling a user to provide inputs to the game machine;
a processing system operable in response to user inputs to execute a game program in accordance with the position determined by the GPS circuitry; and
a housing in which the GPS circuitry and the processing system are both disposed.

10. The game machine according to claim 9, wherein the game machine comprises a hand-held game machine.

11. The game machine according to claim 9, further comprising:
a display,
wherein the processing system is responsive to user inputs to cause the display to display the position determined by the GPS circuitry.

12. The game machine according to claim 9, wherein the housing in which both the GPS circuitry and the processing circuitry is disposed is configured to be hand-held.

13. The game machine according to claim 9, further comprising:
wireless communication circuitry configured for mobile wireless communication.

14. The game machine according to claim 9, wherein the interface comprises a touch-sensitive display screen.

15. The game machine according to claim 9, further comprising:
a camera.

16. A removable device for use with a video game apparatus including a processing system for executing a video game program and input devices for providing inputs to the processing system, the removable device comprising:
an electrical connector that detachably electrically connects the removable device to the video game system;
two-way wireless radio frequency communication circuitry for communicating over a wireless communication network; and
a memory including a first memory portion for storing instructions for performing wireless operations using the two-way wireless radio frequency communication circuitry and a second memory portion for storing instructions for a video game executable by the processing system of the video game system.

17. An accessory device for detachable connection to a video game machine comprising:
two-way wireless communication circuitry; and
a connector for connecting to the video game machine,
wherein the wireless communication circuitry is operative to at least receive wireless communications even when the accessory device is detached from the video game machine.

18. The accessory device according to claim 17, further comprising:
storage for storing the wireless communications received when the accessory device is detached from the video game machine.

19. The accessory device according to claim 17, further comprising:
a notification circuit for providing notifications when wireless communications are received.

20. A portable device usable to play a game comprising:
global positioning system (GPS) circuitry configured to determine position;
a camera;
a user interface configured to receive user inputs, the user interface including a touch-sensitive display screen;
a processing system configured to execute a game program using a position determined by the GPS circuitry;
a wireless communication circuitry for mobile wireless communications; and
a housing configured to be hand-held and to house both the GPS circuitry and the processing system.

* * * * *